(12) United States Patent
    Khanania

(10) Patent No.: US 12,685,402 B2
(45) Date of Patent: Jul. 21, 2026

(54) COOKING SYSTEM WITH BURNER ASSEMBLY AND HEAT EXCHANGER

(71) Applicant: Souhel Khanania, Irving, TX (US)

(72) Inventor: Souhel Khanania, Irving, TX (US)

( * ) Notice: Subject to any disclaimer, the term of this patent is extended or adjusted under 35 U.S.C. 154(b) by 27 days.

(21) Appl. No.: 18/195,169

(22) Filed: May 9, 2023

(65) Prior Publication Data

US 2023/0270274 A1      Aug. 31, 2023

Related U.S. Application Data

(63) Continuation of application No. 16/732,967, filed on Jan. 2, 2020, now Pat. No. 11,690,471, and a continuation-in-part of application No. 15/388,796, filed on Dec. 22, 2016, now Pat. No. 11,346,548, said application No. 16/732,967 is a continuation-in-part of application No. 15/388,941, filed on Dec. 22, 2016.

(60) Provisional application No. 62/271,838, filed on Dec. 28, 2015, provisional application No. 62/271,834, filed on Dec. 28, 2015.

(51) Int. Cl.
    *A47J 27/024*      (2006.01)
    *A47J 27/18*       (2006.01)

(52) U.S. Cl.
    CPC .............. *A47J 27/024* (2013.01); *A47J 27/18* (2013.01)

(58) Field of Classification Search
    CPC ................................ A47J 27/024; A47J 27/18
    See application file for complete search history.

(56) References Cited

U.S. PATENT DOCUMENTS

| | | |
|---|---|---|
| 1,127,899 A | 2/1915 | Koppitz et al. |
| 1,630,309 A | 5/1927 | Pitman |
| 1,991,631 A | 2/1935 | Sangster |

(Continued)

FOREIGN PATENT DOCUMENTS

| | | |
|---|---|---|
| CH | 106654 A | 10/1924 |
| CN | 205402820 U | 7/2016 |

(Continued)

OTHER PUBLICATIONS

Notice of Allowance dated Oct. 10, 2024; U.S. Appl. No. 17/825,717, filed May 26, 2022; 9 pages.

(Continued)

*Primary Examiner* — Michael G Hoang
*Assistant Examiner* — Logan P Jones
(74) *Attorney, Agent, or Firm* — Conley Rose, P.C.; J. Robert Brown, Jr.

(57)                   ABSTRACT

Systems and methods are disclosed that include providing a cooking system that comprises a burner assembly and a heat exchanger submerged in a vessel. The burner assembly includes a high velocity burner and a low velocity burner, the high velocity burner configured to provide the necessary high velocity, volumetric flowrate through a fluid duct of the heat exchanger that includes a plurality of compactly-arranged, alternatingly-disposed vertical and horizontal tubes passing through the fluid duct, and the low velocity burner configured to significantly reduce and/or substantially eliminate "lift off" that could result from operation of only the high velocity burner. The heat exchanger is submerged in the vessel with the tubes of the heat exchanger open to the vessel to allow ingress and egress of a fluid contained within the vessel.

19 Claims, 12 Drawing Sheets

(56) References Cited

U.S. PATENT DOCUMENTS

| | | | |
|---|---|---|---|
| 2,212,905 A | 8/1940 | Tota | |
| 2,243,661 A | 5/1941 | Tota | |
| 2,290,784 A | 7/1942 | Turpin | |
| 2,429,360 A | 10/1947 | Kells | |
| 2,533,143 A | 12/1950 | Scharbau et al. | |
| 2,666,427 A * | 1/1954 | Keating | A47J 37/1247 |
| | | | 122/145 |
| 2,788,848 A | 4/1957 | Furczyk | |
| 2,824,604 A | 2/1958 | Reed | |
| 3,002,553 A | 10/1961 | Reed | |
| 3,065,741 A | 11/1962 | Gerard | |
| 3,333,123 A | 7/1967 | Baumann | |
| 3,351,041 A | 11/1967 | Watson et al. | |
| 3,446,138 A | 5/1969 | Hasten et al. | |
| 3,483,920 A | 12/1969 | Heyn et al. | |
| 3,667,374 A | 6/1972 | Homes | |
| 3,757,746 A | 9/1973 | Sharan | |
| 3,773,019 A | 11/1973 | Hapgood | |
| 3,782,118 A | 1/1974 | Butter et al. | |
| 3,831,560 A | 8/1974 | Kuhnlein | |
| 3,839,951 A | 10/1974 | Palmason | |
| 3,843,313 A | 10/1974 | Helgeson | |
| 3,850,571 A | 11/1974 | Zink et al. | |
| 3,990,433 A | 11/1976 | Keating | |
| 4,020,189 A | 4/1977 | Wright et al. | |
| 4,202,182 A | 5/1980 | Kawashima et al. | |
| 4,253,821 A | 3/1981 | Bradshaw | |
| 4,373,504 A | 2/1983 | Day | |
| 4,466,482 A | 8/1984 | Dorazio et al. | |
| 4,475,587 A | 10/1984 | Vasiliev et al. | |
| 4,615,895 A | 10/1986 | Bhattacharjee | |
| 4,662,350 A | 5/1987 | Mossbach | |
| 4,702,693 A | 10/1987 | Frailoi | |
| 4,786,247 A | 11/1988 | Bhattacharjee | |
| 4,825,846 A | 5/1989 | Frailoi | |
| 4,848,318 A | 7/1989 | Brewer | |
| 4,858,592 A | 8/1989 | Hayek et al. | |
| 4,889,103 A | 12/1989 | Frailoi | |
| 4,980,187 A | 12/1990 | Johnson | |
| 5,137,740 A | 8/1992 | Benson et al. | |
| 5,209,218 A | 5/1993 | Daneshvar et al. | |
| 5,230,796 A | 7/1993 | Ter Meulen | |
| 5,251,693 A | 10/1993 | Zifferer | |
| 5,287,919 A | 2/1994 | George, II et al. | |
| 5,318,438 A | 6/1994 | Sugahara et al. | |
| 5,540,215 A | 7/1996 | Fritzsche et al. | |
| 5,690,166 A | 11/1997 | Yamaguchi | |
| 5,779,465 A | 7/1998 | Clarke et al. | |
| 5,901,641 A | 5/1999 | McNamara | |
| 6,029,653 A | 2/2000 | Tiszai | |
| 6,085,701 A | 7/2000 | Stauffer et al. | |
| 6,103,118 A * | 8/2000 | Ter Meulen | F28D 7/0083 |
| | | | 210/321.89 |
| 6,315,552 B1 | 11/2001 | Haynes | |
| 6,561,183 B1 | 5/2003 | Spilde et al. | |
| 6,837,234 B2 | 1/2005 | Rabas et al. | |
| 7,040,385 B2 | 5/2006 | Higashiyama | |
| 7,303,777 B2 | 12/2007 | Baas et al. | |
| 9,074,765 B2 | 7/2015 | Armanni | |
| 11,346,548 B2 | 5/2022 | Khanania | |
| 11,346,549 B2 | 5/2022 | Khanania | |
| 11,690,471 B2 * | 7/2023 | Khanania | A47J 27/024 |
| | | | 126/21 A |
| 2003/0034027 A1 | 2/2003 | Yamamoto et al. | |
| 2004/0250810 A1 | 12/2004 | Schultz et al. | |
| 2005/0056270 A1 | 3/2005 | Babington | |
| 2005/0181102 A1 | 8/2005 | Basker et al. | |
| 2005/0194120 A1 | 9/2005 | Lomax, Jr. et al. | |
| 2006/0177788 A1 | 8/2006 | Kang et al. | |
| 2007/0042306 A1 | 2/2007 | Bacon | |
| 2007/0089732 A1 | 4/2007 | Ricord et al. | |
| 2007/0137497 A1 | 6/2007 | Savage et al. | |
| 2007/0254254 A1 | 11/2007 | Gehring et al. | |
| 2008/0022994 A1 | 1/2008 | Hutchinson et al. | |
| 2009/0061369 A1 | 3/2009 | Wang et al. | |
| 2009/0283462 A1 | 11/2009 | Schroeder | |
| 2010/0012304 A1 | 1/2010 | Lee et al. | |
| 2010/0081098 A1 | 4/2010 | D'Agostini et al. | |
| 2010/0139885 A1 | 6/2010 | Hoffman et al. | |
| 2010/0282095 A1 | 11/2010 | Highnote | |
| 2011/0287154 A1 | 11/2011 | Resser et al. | |
| 2012/0121771 A1 | 5/2012 | Jones | |
| 2013/0025546 A1 | 1/2013 | Okamoto et al. | |
| 2013/0118719 A1 | 5/2013 | Jordan | |
| 2013/0213385 A1 | 8/2013 | O'Donnell et al. | |
| 2013/0260323 A1 | 10/2013 | Hong et al. | |
| 2013/0312700 A1 | 11/2013 | Oda | |
| 2014/0080072 A1 | 3/2014 | Smirnov et al. | |
| 2014/0165991 A1 | 6/2014 | Noman et al. | |
| 2015/0128926 A1 | 5/2015 | Noman et al. | |
| 2015/0305541 A1 | 10/2015 | Wassmus et al. | |
| 2016/0146541 A1 | 5/2016 | De Nardis | |
| 2017/0131034 A1 | 5/2017 | Ribarov et al. | |
| 2017/0184304 A1 | 6/2017 | Khanania | |
| 2017/0265683 A1 | 9/2017 | Gogel et al. | |
| 2018/0142896 A1 | 5/2018 | Jacobs | |
| 2019/0142220 A1 | 5/2019 | Shirali et al. | |
| 2019/0382683 A1 | 12/2019 | Devine et al. | |
| 2020/0245803 A1 | 8/2020 | Khanania | |
| 2020/0309408 A1 | 10/2020 | Kawada | |
| 2021/0321823 A1 | 10/2021 | Kalling | |
| 2022/0282863 A1 | 9/2022 | Khanania | |
| 2022/0330754 A1 | 10/2022 | Broadbent et al. | |
| 2025/0107663 A1 | 4/2025 | Tubic et al. | |

FOREIGN PATENT DOCUMENTS

| | | | |
|---|---|---|---|
| CN | 205448295 U | 8/2016 | |
| CN | 205537227 U | 8/2016 | |
| DE | 102008055981 A1 | 5/2010 | |
| EP | 0859199 B1 | 10/2004 | |
| EP | 2160966 A1 | 3/2010 | |
| GB | 599536 A | 3/1948 | |
| GB | 934339 A | 8/1963 | |
| GB | 1311752 A | 3/1973 | |
| GB | 2032611 A | 5/1980 | |
| JP | 5792643 A | 6/1982 | |
| JP | 2000253838 A | 9/2000 | |
| JP | 2004308945 A | 11/2004 | |
| JP | 2005061688 A | 3/2005 | |
| JP | 2006132826 A | 5/2006 | |
| JP | 2021083558 A | 6/2021 | |
| KR | 101768528 B1 | 8/2017 | |
| KR | 101775873 B1 | 9/2017 | |
| WO | 9617672 A1 | 6/1996 | |
| WO | 2015085098 A1 | 6/2015 | |
| WO | 2020006094 A1 | 1/2020 | |

OTHER PUBLICATIONS

Khanania, Souhel; U.S. Appl. No. 17/840,226; filed Jun. 14, 2022; Title: Cooking System and Heat Exchanger; 85 pages.

Khanania, Souhel; U.S. Appl. No. 17/840,229; filed Jun. 14, 2022; Title: Cooking System and Vessel; 83 pages.

Office Action dated May 28, 2019; U.S. Appl. No. 15/388,796, filed Dec. 22, 2016; 32 pages.

Office Action dated Jan. 8, 2020; U.S. Appl. No. 15/388,796, filed Dec. 22, 2016; 16 pages.

Final Office Action dated Sep. 4, 2020; U.S. Appl. No. 15/388,796, filed Dec. 22, 2016; 21 pages.

Advisory Action dated Feb. 2, 2021; U.S. Appl. No. 15/388,796, filed Dec. 22, 2016; 8 pages.

Office Action dated Jun. 17, 2021; U.S. Appl. No. 15/388,796, filed Dec. 22, 2016; 21 pages.

Notice of Allowance dated Feb. 4, 2022; U.S. Appl. No. 15/388,796, filed Dec. 22, 2016; 21 pages.

Office Action dated Dec. 28, 2018; U.S. Appl. No. 15/388,941, filed Dec. 22, 2016; 29 pages.

Final Office Action dated Apr. 30, 2019; U.S. Appl. No. 15/388,941, filed Dec. 22, 2016; 20 pages.

Advisory Action dated Jul. 29, 2019; U.S. Appl. No. 15/388,941, filed Dec. 22, 2016; 3 pages.

(56)　　　　References Cited

OTHER PUBLICATIONS

Office Action dated Sep. 4, 2019; U.S. Appl. No. 15/388,941, filed Dec. 22, 2016; 18 pages.
Office Action dated Jan. 9, 2020; U.S. Appl. No. 16/022,390, filed Jun. 28, 2018; 37 pages.
Final Office Action dated Sep. 4, 2020; U.S. Appl. No. 16/022,390, filed Jun. 28, 2018; 19 pages.
Office Action dated Jul. 29, 2021; U.S. Appl. No. 16/022,390, filed Jun. 28, 2018; 27 pages.
Final Office Action dated Nov. 5, 2021; U.S. Appl. No. 16/022,390, filed Jun. 28, 2018; 13 pages.
Notice of Allowance dated Jan. 26, 2022; U.S. Appl. No. 16/022,390, filed Jun. 28, 2018; 5 pages.
Office Action dated Jul. 9, 2021; U.S. Appl. No. 16/732,967, filed Jan. 2, 2020; 29 pages.
Final Office Action dated Feb. 15, 2022; U.S. Appl. No. 16/732,967, filed Jan. 2, 2020; 46 pages.
PCT International Search Report; Application No. PCT/US2016/068358; Apr. 14, 2017; 3 pages.
PCT Written Opinion of the International Searching Authority; Application No. PCT/US2016/068358; Apr. 14, 2017; 11 pages.
Australian Office Action; Application No. 2016380160; Sep. 20, 2021; 4 pages.
Australian Office Action; Application No. 2016380160; Mar. 4, 2022; 2 pages.
Australian Office Action; Application No. 2016380160; Mar. 31, 2022; 2 pages.
Brazilian Office Action; Application No. 1120180133108; Published in IP Gazette May 19, 2020; 6 pages.
European Extended Search Report; Application No. 16882436.5; Aug. 6, 2019; 7 pages.
European Examination Report; Application No. 16882436.5; Feb. 26, 2021; 4 pages.
European Examination Report; Application No. 16882436.5; Feb. 11, 2022; 4 pages.
Mexican Office Action; Application No. MX/a/2018/007951; May 19, 2022; 4 pages.
PCT International Search Report; Application No. PCT/US2016/068383; Mar. 30, 2017; 3 pages.
PCT Written Opinion of the International Searching Authority; Application No. PCT/US2016/068383; Mar. 30, 2017; 8 pages.
European Extended Search Report; Application No. 16882441.5; Aug. 19, 2019; 12 pages.
PCT International Search Report & Written Opinion of the International Searching Authority; Application No. PCT/US2019/039271; Oct. 18, 2019; 11 pages.
Australian Office Action; Application No. 2019295701; Nov. 17, 2021; 5 pages.
European Extended Search Report; Application No. 19825728.9; Feb. 11, 2022; 7 pages.
Office Action dated Jul. 19, 2022; U.S. Appl. No. 16/732,967, filed Jan. 2, 2020; 34 pages.
Notice of Allowance dated Feb. 22, 2023; U.S. Appl. No. 16/732,967, filed Jan. 2, 2020; 24 pages.

Office Action dated Mar. 16, 2023; U.S. Appl. No. 17/825,717, filed May 26, 2022; 5 pages.
Mexican Office Action; Application No. MX/a/2018/007951; Aug. 10, 2022; 5 pages.
Australian Office Action; Application No. 2019295701; Aug. 3, 2022; 4 pages.
PCT International Search Report & Written Opinion of the International Searching Authority; Application No. PCT/US2023/023516; Sep. 18, 2023; 10 pages.
PCT International Search Report & Written Opinion of the International Searching Authority; Application No. PCT/US2023/023514; Sep. 12, 2023; 11 pages.
Final Office Action dated Nov. 6, 2023; U.S. Appl. No. 17/825,717, filed May 26, 2022; 17 pages.
Advisory Action dated Jan. 30, 2024; U.S. Appl. No. 17/825,717, filed May 26, 2022; 3 pages.
Office Action dated Apr. 2, 2024; U.S. Appl. No. 17/825,717, filed May 26, 2022; 13 pages.
European Examination Report; Application No. 19825728.9; Dec. 8, 2023; 4 pages.
Mexican Office Action; Application No. MX/a/2021/000181; Apr. 16, 2024; 5 pages.
Mexican Office Action; Application No. MX/a/2021/000181; Jul. 9, 2024; 6 pages.
Khanania, Souhel; U.S. Appl. No. 18/446,250; filed Aug. 8, 2023; Title: Cooking System and Heat Exchanger with Combustion Chamber; 69 pages.
Office Action dated Jun. 30, 2023; U.S. Appl. No. 17/825,717, filed May 26, 2022; 39 pages.
Brazilian Office Action; Application No. 112020026760-0; Jun. 8, 2023; 6 pages.
Brazilian Office Action; Application No. 112020026760-0; Feb. 4, 2025; 5 pages.
Office Action dated May 5, 2025; U.S. Appl. No. 17/840,226, filed Jun. 14, 2022; 8 pages.
Office Action dated Jun. 26, 2025; U.S. Appl. No. 17/840,229, filed Jun. 14, 2022; 89 pages.
Office Action dated Aug. 14, 2025; U.S. Appl. No. 17/840,226, filed Jun. 14, 2022; 84 pages.
European Extended Search Report; Application No. 23824402.4; Aug. 20, 2025; 8 pages.
Final Office Action dated Dec. 4, 2025; U.S. Appl. No. 17/840,229, filed Jun. 14, 2022; 34 pages.
Advisory Action dated Feb. 6, 2026; U.S. Appl. No. 17/840,229, filed Jun. 14, 2022; 3 pages.
Office Action dated Dec. 4, 2025; U.S. Appl. No. 18/446,250, filed Aug. 8, 2023; 62 pages.
Final Office Action dated Mar. 23, 2026; U.S. Appl. No. 17/840,226, filed Jun. 14, 2022; 26 pages.
Notice of Allowance dated Mar. 27, 2026; U.S. Appl. No. 18/446,250, filed Aug. 8, 2023; 13 pages.
European Extended Search Report; Application No. 23824401.6; May 21, 2026; 8 pages.

* cited by examiner

COOKING SYSTEM WITH BURNER ASSEMBLY AND HEAT EXCHANGER

CROSS-REFERENCE TO RELATED APPLICATIONS

The present application is a continuation of U.S. patent application Ser. No. 16/732,967 filed Jan. 2, 2020, entitled "Cooking System with Burner Assembly and Heat Exchanger," which is a continuation-in-part of U.S. patent application Ser. No. 15/388,796, filed Dec. 22, 2016, entitled "Burner Assembly and Heat Exchanger," which further claims priority to U.S. Provisional Patent Application No. 62/271,834 filed on Dec. 28, 2015, entitled "Burner Assembly and Heat Exchanger," the disclosures of each being hereby incorporated by reference in their entireties. The present application is also a continuation-in-part of U.S. patent application Ser. No. 15/388,941, filed Dec. 22, 2016, entitled "Burner Assembly and Heat Exchanger," which further claims priority to U.S. Provisional Patent Application No. 62/271,838 filed on Dec. 28, 2015, entitled "Burner Assembly and Heat Exchanger," the disclosures of each being hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Food service equipment often includes heat generation equipment and/or heat transfer equipment to produce and/or transfer heat to a cooking medium contained in a cooking vessel for cooking consumables prior to packaging. Such heat generation equipment and/or heat transfer equipment often includes a burner configured to combust an air/fuel mixture to produce heat and a heat exchanger to transfer the heat produced by the burner to the cooking medium. Traditional food service burners and/or heat exchangers may often be inefficient at transferring heat to the cooking medium and/or require frequent monitoring and/or replacement of the cooking medium.

SUMMARY

In some embodiments of the disclosure, a cooking system is disclosed as comprising: a burner assembly; and a heat exchanger, comprising: a plurality of walls that form a fluid duct configured to receive a combusted air/fuel mixture from the burner assembly; and a plurality of tubes disposed across the fluid duct and configured to receive fluid therethrough; wherein the heat exchanger is connected to the burner assembly and disposed within a vessel.

In other embodiments of the disclosure, a method of operating a cooking system is disclosed as comprising: providing a burner assembly configured to combust an air/fuel mixture; providing a heat exchanger comprising a plurality of walls that form a fluid duct configured to receive a combusted air/fuel mixture from the burner assembly, and a plurality of tubes disposed across the fluid duct and configured to receive fluid therethrough; disposing the heat exchanger in a vessel that contains a fluid; allowing fluid to at least partially fill the plurality of tubes; combusting the air/fuel mixture in the burner assembly; and transferring heat resulting from the combustion of the air/fuel mixture to the fluid within the plurality of tubes.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
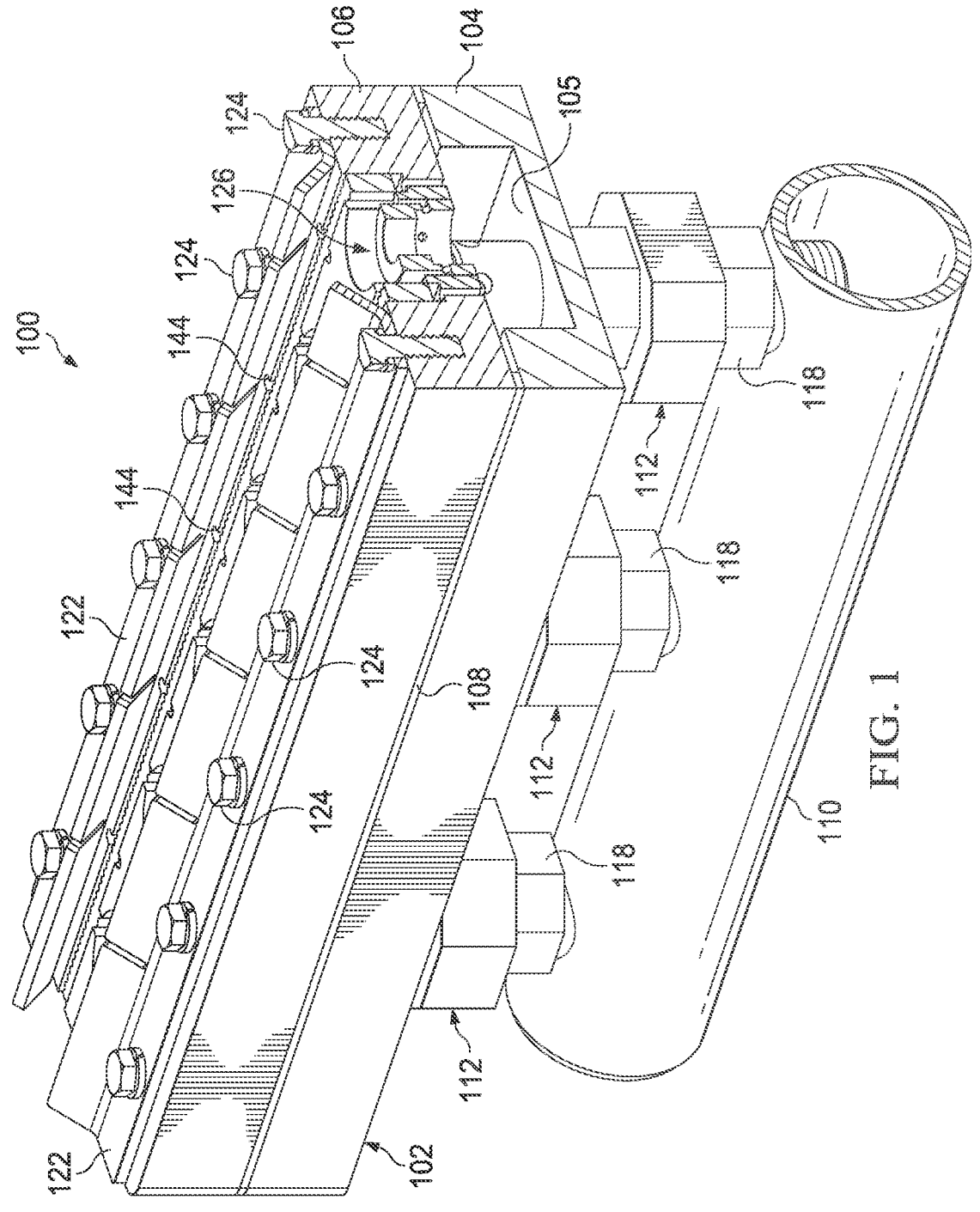
FIG. 1 is an oblique side view showing a partial cross-section of a burner assembly according to an embodiment of the disclosure.
Figure 2:
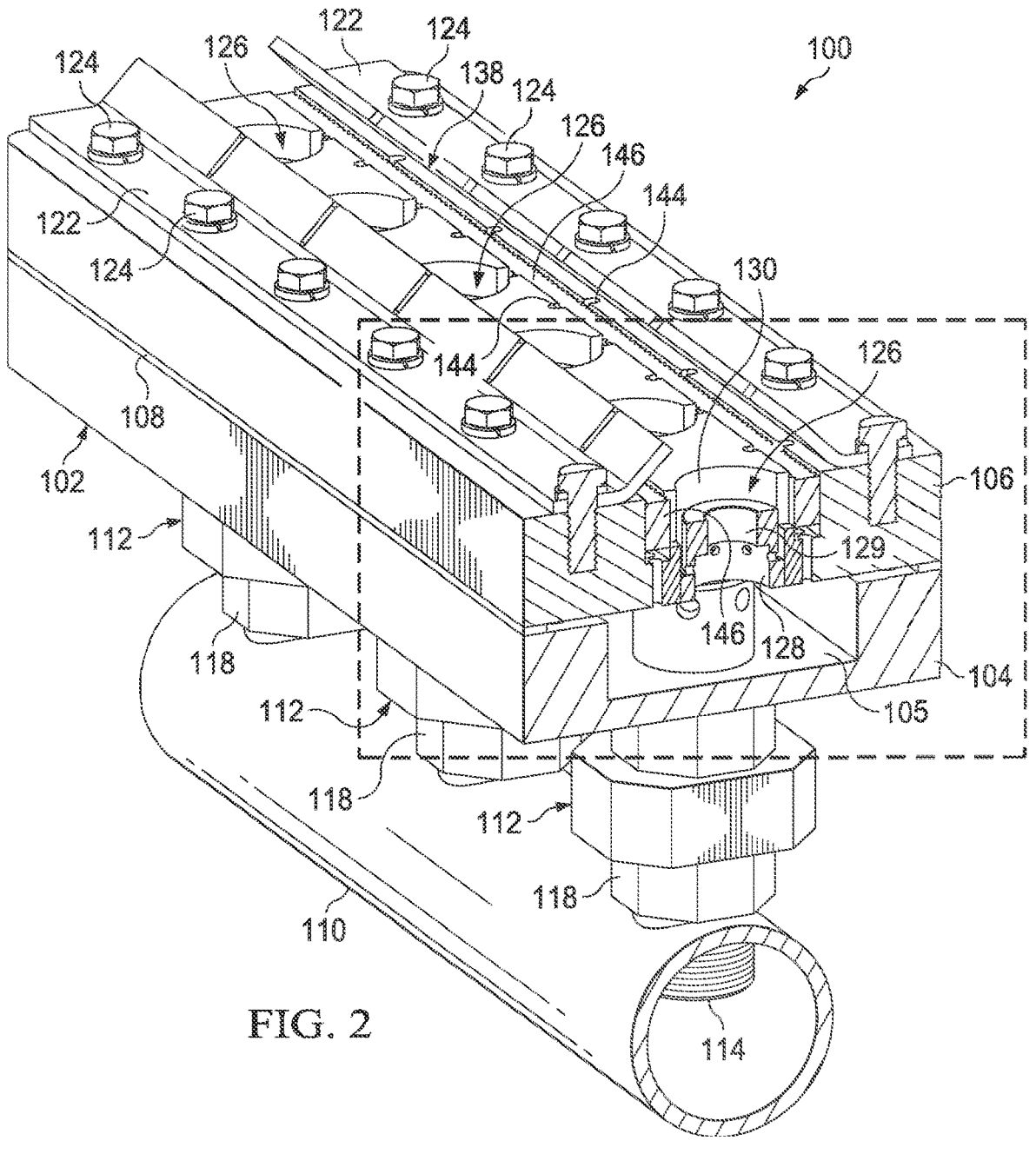
FIG. 2 is an oblique front view showing the partial cross-section of the burner assembly of FIG. 1 according to an embodiment of the disclosure.
Figure 3:
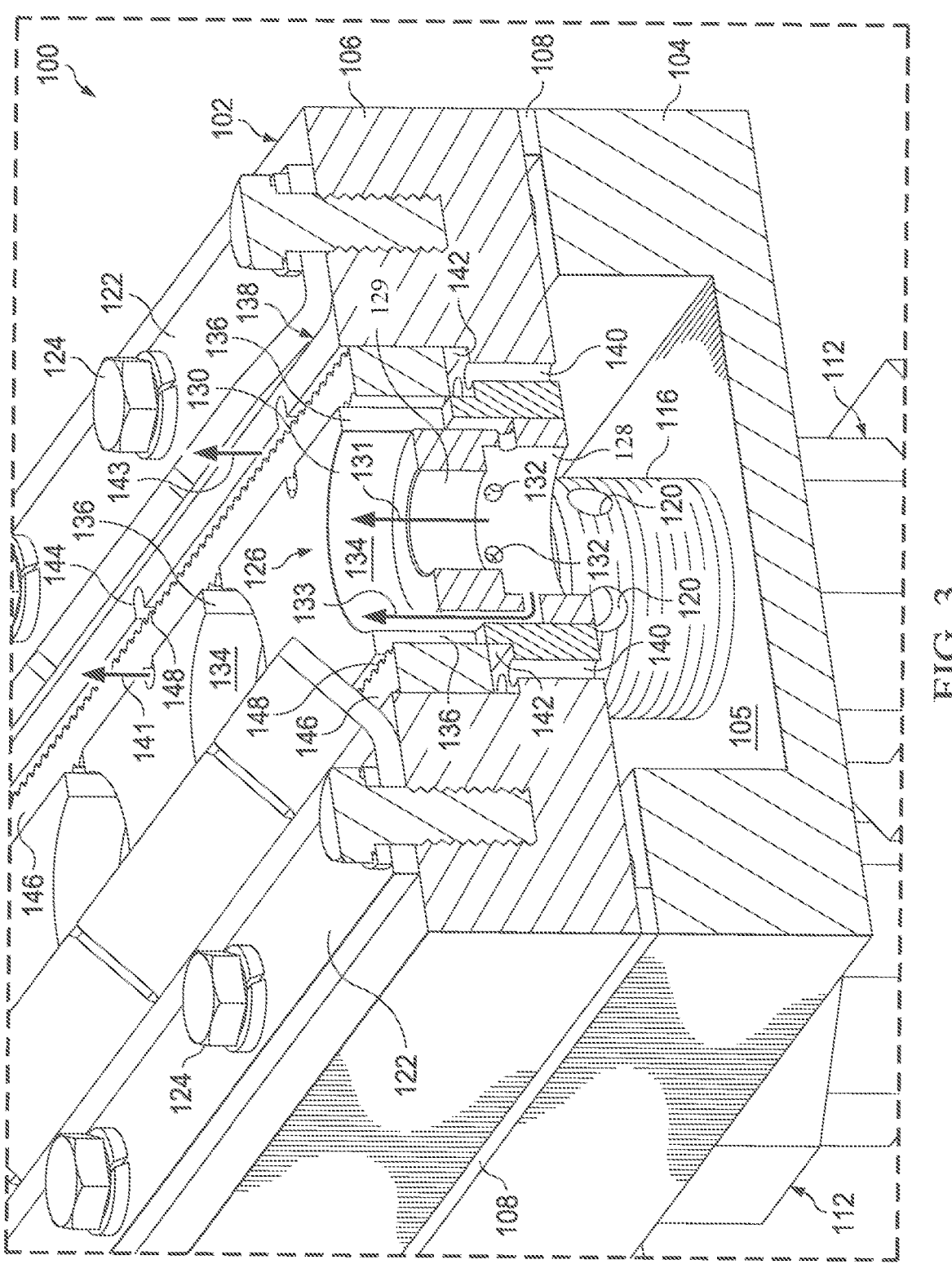
FIG. 3 is a detailed oblique front view of the partial cross-section of the burner assembly of FIGS. 1-2 according to an embodiment of the disclosure.
Figure 4:
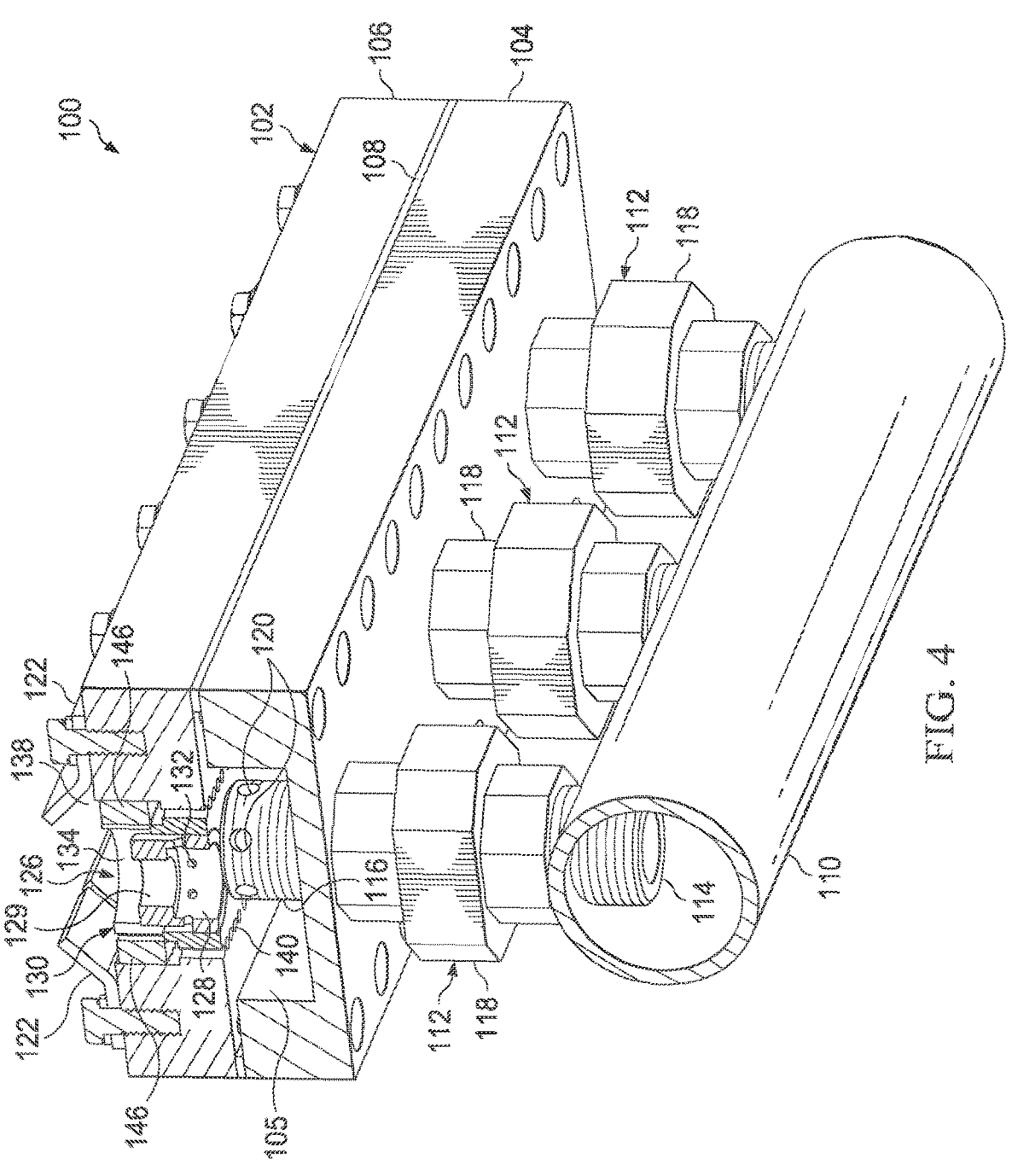
FIG. 4 is an oblique bottom view showing the partial cross-section of the burner assembly of FIGS. 1-3 according to an embodiment of the disclosure.
Figure 5:
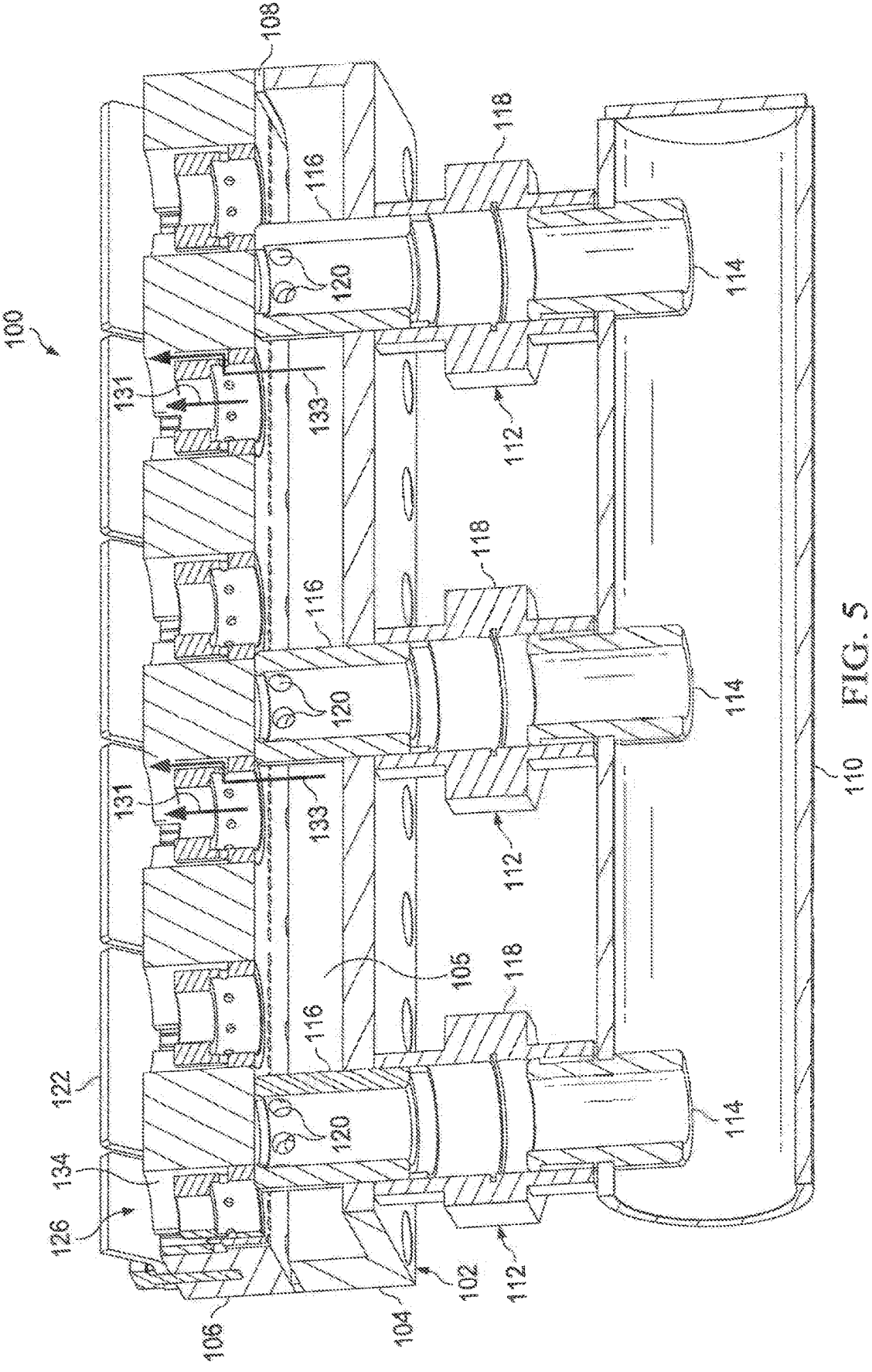
FIG. 5 is an oblique cross-sectional right side view showing the partial cross-section of the burner assembly of FIGS. 1-4 according to an embodiment of the disclosure.

In some cases, it may be desirable to provide a cooking system with a burner assembly having a high velocity burner to force combusted air and fuel through a heat exchanger and a low velocity burner to maintain a continuous combustion process and prevent so-called "lift off" where a flame and/or combustion process may be extinguished by a high velocity combustion process that exceeds the ignition capabilities of the burner assembly. For example, where a heat exchanger is submerged in a cooking vessel and comprises a plurality of compactly-arranged, interstitially-spaced vertical and horizontal tubes that are open to the cooking vessel to allow ingress and egress of a cooking fluid, resistance to fluid flow through a fluid duct of the heat exchanger may be excessive, such that traditional burners would fail to pass combusted air and fuel through the heat exchanger and would suffer from "lift off" if the velocity and/or flowrate of combustion was increased. Accordingly, a cooking system is disclosed herein that comprises providing a burner assembly having a high velocity burner configured to provide the necessary high velocity flowrate through a heat exchanger having a plurality of compactly-arranged, interstitially-spaced vertical and horizontal tubes that are open to the cooking vessel to allow ingress and egress of a cooking fluid, and a low velocity burner configured to significantly reduce and/or substantially eliminate "lift off" that could result from operation of only the high velocity burner.

Referring now to FIGS. 1-5, various views of a burner assembly 100 are shown according to an embodiment of the disclosure. The burner assembly 100 generally comprises a body 102, a manifold 110, a plurality of runners 112 joining the body 102 to the manifold 110, a plurality of first burners 126, a plurality of second burners 138, a ribbon burner 146, and a plurality of deflectors 122. The body 102 comprises a lower portion 104 joined to an upper portion 106. In some embodiments, the lower portion 104 may be bolted to the upper portion 106 using fasteners 124 disposed through holes in the lower portion 104 and threaded into the upper portion 106. In some embodiments, a gasket 108 may be disposed between the lower portion 104 and the upper portion 106 of the body 102 to prevent leakage and/or seepage of any fluid flowing within the cavity 105 from escaping between the lower portion 104 and the upper portion 106. When assembled, the lower portion 104 and the upper portion 106 generally form a cavity 105 through which fuel and/or an air/fuel mixture may flow.

The burner assembly 100 also comprises a manifold 110 configured to deliver the fuel and/or the air/fuel mixture into the cavity 105 through a plurality of parallel runners 112. Each runner 112 comprises a lower threaded portion 114, an upper threaded portion 116, and a butt joint 118 that joins the lower threaded portion 114 to the upper threaded portion 116. In some embodiments, it will be appreciated that each runner 112 may be a solid piece and comprise the lower threaded portion 114 and the upper threaded portion 116 joined by the butt joint 118. The lower threaded portion 114 may generally be threaded into and extend into an inner opening of the manifold 110, such that fuel and/or an air/fuel mixture may flow from an internal volume of the manifold 110 through an internal volume of the lower threaded portion 114 and into an internal volume of the butt joint 118. The upper threaded portion 116 may generally be threaded into the lower portion 104 of the body 102 and extend into the cavity 105 of the body 102. Accordingly, an internal volume of the upper threaded portion 116 may receive fuel and/or an air/fuel mixture from the internal volume of the butt joint 118. It will be appreciated that each runner 112 thus comprises a fluid flow path that extends through internal volumes of the lower threaded portion 114, the butt joint 118, and the upper threaded portion 116. Furthermore, the upper threaded portion 116 comprises a plurality of fuel delivery holes 120 that may distribute the fuel and/or the air/fuel mixture received from the manifold 110 evenly throughout the cavity 105. Additionally, in some embodiments, an upper distal end of the upper threaded portion 116 may be closed and/or substantially abut a substantially flat surface of the upper portion 106 of the body 102 so that the fuel and/or the air/fuel mixture that passes through the runner 112 only escapes the upper threaded portion 116 through the fuel delivery holes 120.

The burner assembly 100 comprises a plurality of first burners 126 arranged adjacently along a length of the upper portion 106 of burner assembly 100. Additionally, the plurality of first burners 126 are arranged along a centerline of the upper portion 106 of the body 102, such that the centerline of the body 102 intersects a center axis of each first burner 126. Each first burner 126 comprises a cylindrically-shaped first bore 128 configured to receive the fuel and/or the air/fuel mixture from the cavity 105. The first bore 128 also comprises a plurality of holes 132 disposed about the first bore 128 that are configured to allow the fuel and/or the air/fuel mixture to flow from the first bore 128 to a combustion chamber 134 that is formed by a cylindrically-shaped third bore 130. Each first burner 126 also comprises a cylindrically-shaped second bore 129 that is axially aligned with and disposed downstream from the first bore 128 with respect to the flow of the fuel and/or the air/fuel mixture through the burner assembly 100 and that comprises a diameter that is smaller than the diameter of the first bore 128. The second bore 129 may also receive the fuel and/or the air/fuel mixture from the first bore 128. In some embodiments, the smaller diameter of the second bore 129 may be sized to control a pressure drop through the second bore 129 and/or the plurality of holes 132 disposed about the first bore 128.

Accordingly, the first burner 126 may define a first flowpath 131 from the cavity 105 through the first bore 128 and the second bore 129 into the combustion chamber 134 and further define a plurality of second flowpaths 133 from the cavity 105 through the first bore 128, through the plurality of holes 132, and into the combustion chamber 134. Furthermore, as will be discussed herein in further detail, to ignite the fuel and/or the air/fuel mixture in the first burner 126, each first burner 126 also comprises a groove 136 disposed in the third bore 130 that forms the cylindrically-shaped combustion chamber 134 on each of an opposing left side and right side of the combustion chamber 134 so that fuel through the first flowpath 131 and the plurality of second flowpaths 133 of the first burner 126 may be ignited by the ribbon burner 146. In some embodiments, the flowrate and/or volume of the fuel and/or the air/fuel mixture through the first flowpath 131 of the first burner 126 may be greater than the flowrate and/or volume of the fuel and/or the air/fuel mixture through the plurality of second flowpaths 133 through the first burner 126. However, in other embodiments, the flowrate and/or volume of the fuel and/or the air/fuel mixture through the first flowpath 131 of the first burner 126 may be equal to or less than the flowrate and/or volume of the fuel and/or the air/fuel mixture through the plurality of second flowpaths 133 through the first burner 126.

The burner assembly 100 also comprises a plurality of second burners 138 disposed on each of a left side and a right side of the upper portion 106 of the body 102 of burner assembly 100. Each second burner 138 may generally be configured as a low flow-rate ribbon burner 146 that comprises a plurality of feeder holes 140, a cavity 142, and a plurality of upper holes 144. The feeder holes 140 are configured to receive the fuel and/or the air/fuel mixture from the cavity 105 and allow the fuel and/or the air/fuel mixture to flow into a cavity 142 that houses the ribbon burner 146. The second burner 138 also comprises a plurality of upper holes 144 that are disposed on the left and right sides of the cavity 142 and the ribbon burner 146. The upper holes 144 receive fuel and/or air/fuel mixture from the cavity 142. Accordingly, the second burner 138 may define a first flowpath 141 from the cavity 105 through a plurality of feeder holes 140, into the cavity 142, and through a plurality of upper holes 144. Furthermore, as will be discussed herein in further detail, the fuel and/or the air/fuel mixture flowing through the upper holes 144 may be ignited by the ribbon burner 146.

Additionally, the ribbon burner 146 comprises a plurality of small perforations 148 that may also allow the fuel and/or the air/fuel mixture to pass through a plurality of second flowpaths 143 from the cavity 142 through the perforations 148, where they may be ignited by the ribbon burner 146. In some embodiments, the flowrate and/or volume of the fuel and/or the air/fuel mixture through the first flowpath 141 of the second burner 138 may be greater than the flowrate and/or volume of the fuel and/or the air/fuel mixture through the plurality of second flowpaths 143 through the second burner 138. However, in other embodiments, the flowrate and/or volume of the fuel and/or the air/fuel mixture through the first flowpath 141 of the second burner 138 may be equal to or less than the flowrate and/or volume of the fuel and/or air/fuel mixture through the plurality of second flowpaths 143 through the second burner 138. Additionally, in some embodiments, the combined flowrate and/or volume of the fuel and/or the air/fuel mixture through a first burner 126 may be greater than the flowrate and/or volume of the fuel and/or the air/fuel mixture through a second burner 138. However, in alternative embodiments, the combined flowrate and/or volume of the fuel and/or the air/fuel mixture through a first burner 126 may be equal to or less than the flowrate and/or volume of the fuel and/or the air/fuel mixture through a second burner 138.

In some embodiments, the burner assembly 100 may comprise one or more infrared burners. Accordingly, the first burner 126, the second burner 138, and/or the ribbon burner 146 may be configured as an infrared burner. Accordingly, first burner 126, the second burner 138, and/or the ribbon burner 146 may comprise additional components, including but not limited to, ceramic components and/or other components necessary to configure and/or operate the first burner 126, the second burner 138, and/or the ribbon burner 146 as an infrared burner. However, in some embodiments, the first burner 126, the second burner 138, and/or the ribbon burner 146 may alternatively be configured as any other suitable burner.

In operation, the burner assembly 100 is configured to combust fuel and/or an air/fuel mixture through a plurality of first burners 126 and a plurality of second burners 138. In some embodiments, the burner assembly 100 may also comprise a separate igniter and/or a plurality of igniters configured to ignite the air/fuel mixture in each of the first burners 126 and second burners 138. In this embodiment, the combined flowrate and/or volume of the fuel and/or the air/fuel mixture through the first burners 126 is greater than the flowrate and/or volume of the fuel and/or the air/fuel mixture through the plurality of second burners 138. Accordingly, the velocity of the combusted fuel and/or the combusted air/fuel mixture through the first burners 126 is higher than the velocity of the combusted fuel and/or the combusted air/fuel mixture through the second burners 138.

Because the velocity of the combusted fuel and/or the combusted air/fuel mixture through the first burners 126 exits the first burners 126 at such a high velocity, traditional burners may experience so-called "lift off" where the flame is extinguished due to the high velocity. As such, the lower velocity of the combusted fuel and/or the combusted air/fuel mixture exiting the second burners 138 may prevent this "lift off" by continuously burning fuel at a lower flowrate and/or delivering a combusted air/fuel mixture at the lower velocity. Additionally, the burner assembly 100 also comprises a deflector 122 on each of a left side and a right side of the upper portion 106 of the body 102 of burner assembly 100 that is secured to the upper portion 106 of the body 102 by a plurality of fasteners 124. The deflectors 122 may be angled towards a center of the upper portion 106 and extend over the second burners 138 in order to deflect the combusted air/fuel mixture exiting the second burners 138 towards the combusted air/fuel mixture exiting the first burners 126. Accordingly, the deflectors 122 may also aid in preventing "lift off" by directing the lower velocity combusted air/fuel mixture exiting the second burners 138 towards the higher velocity combusted air/fuel mixture exiting the first burners 126.

Figure 6:
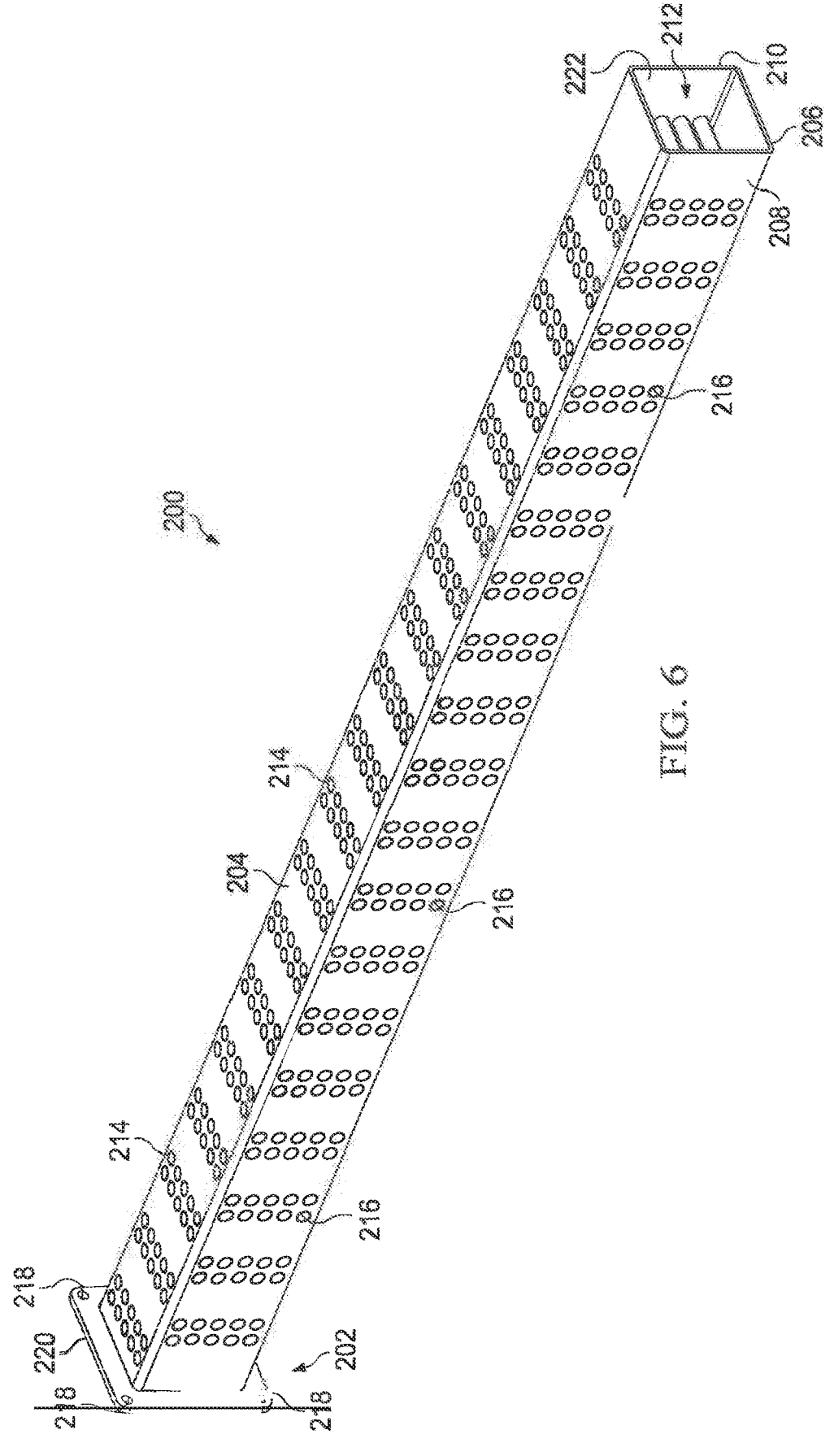
FIG. 6 is an oblique side view of a heat exchanger according to an embodiment of the disclosure.
Figure 7:
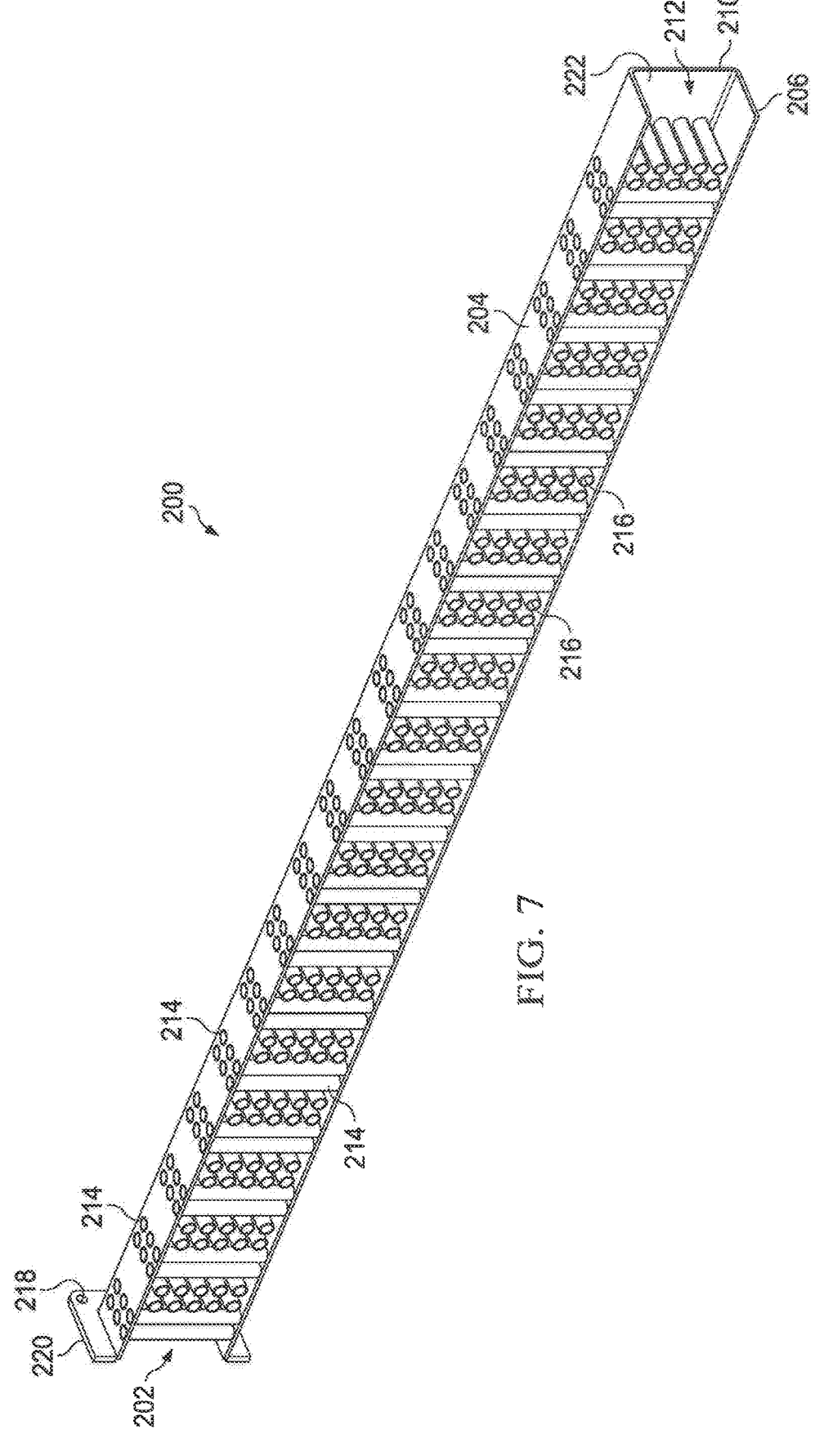
FIG. 7 is an oblique cross-sectional side view of the heat exchanger of FIG. 6 according to an embodiment of the disclosure.

Referring now to FIGS. 6 and 7, an oblique side view and an oblique cross-sectional side view of a heat exchanger 200 are shown, respectively, according to an embodiment of the disclosure. The heat exchanger 200 generally comprises a top wall 204, a bottom wall 206, a left side wall 208, and a right side wall 210 that define a fluid duct 222 having an inlet 202 and an outlet 212 through the heat exchanger 200. Heat exchanger 200 also comprises a plurality of vertical tubes 214 that extend between the top wall 204 and the bottom wall 206. The plurality of vertical tubes 214 may extend through the top wall 204 and the bottom wall 206 to allow ingress and egress of fluid into the vertical tubes 214 through each of the top wall 204 and bottom wall 206. Additionally, heat exchanger 200 also comprises a plurality of horizontal tubes 216 that extend between the left side wall 208 and the right side wall 210. The plurality of horizontal tubes 216 may extend through the left side wall 208 and the right side wall 210 to allow ingress and egress of fluid into the horizontal tubes 216 through each of the left side wall 208 and the right side wall 210.

The vertical tubes 214 and the horizontal tubes 216 of the heat exchanger 200 may generally be arranged to provide a compact, highly resistive flowpath through the fluid duct 222. In order to effectively and/or evenly distribute the heat produced by burner assembly 100 through the vertical tubes 214 and the horizontal tubes 216, sets and/or rows of vertical tubes 214 may be interstitially and/or alternatively spaced with sets and/or rows of horizontal tubes 216. In the shown embodiment, two rows of vertical tubes 214 are interstitially and/or alternatively spaced with two rows of horizontal tubes 216 along the length of the heat exchanger 200. However, in alternative embodiments, a single row of vertical tubes 214 may be interstitially and/or alternatively spaced with a single row of horizontal tubes 216 along the length of the heat exchanger 200. In other embodiments, however, heat exchanger 200 may comprise any number of rows of vertical tubes 214 interstitially and/or alternatively spaced with any number of rows of horizontal tubes 216 along the length of the heat exchanger 200. For example, heat exchanger 200 may comprise three rows of vertical tubes 214 interstitially and/or alternatively spaced with two rows of horizontal tubes 216. Accordingly, it will be appreciated that the number of rows or vertical tubes 214 interstitially and/or alternatively spaced with rows of horizontal tubes 216 may vary, so long as at least one row of vertical tubes 214 is interstitially and/or alternatively spaced with at least one row of horizontal tubes 216 along the length of the heat exchanger 200.

The heat exchanger 200 also comprises a plurality of mounting holes 218 disposed through a mounting flange 220 that is disposed at the distal end of the heat exchanger 200 located closest to the inlet 202. The mounting holes 218 may generally be configured to mount the heat exchanger 200 to the burner assembly 100 of FIGS. 1-5. In some embodiments, the heat exchanger 200 may be secured to the burner assembly 100 via fasteners 124. However, in other embodiments, the heat exchanger 200 may be secured to the burner assembly 100 through an alternative mechanical interface. The heat exchanger 200 is secured to the burner assembly 100 so that combusted fuel and/or combusted air/fuel mixture is forced through the fluid duct 222 of the heat exchanger 200. Accordingly, heat from the combusted fuel and/or combusted air/fuel mixture may be absorbed by a fluid flowing through the tubes 214, 216 of the heat exchanger 200. The heated fluid may exit the heat exchanger 200 through the outlet 212 and therefore be used to heat and/or cook consumable products (i.e., chips, crackers, frozen foods).

In operation, the configuration of tubes 214, 216 provides a compact, highly resistive flowpath through the fluid duct 222. Accordingly, to force combusted fuel and/or combusted air/fuel mixture through the fluid duct 222 requires high velocity. Accordingly, the velocity of the combusted fuel and/or the combusted air/fuel mixture through the first burners 126 of the burner assembly 100 is high enough to provide the requisite velocity needed to overcome the resistance to flow through the heat exchanger 200. Furthermore, the lower velocity of the combusted fuel and/or the combusted air/fuel mixture through the second burners 138 of the burner assembly 100 prevents "lift off" so that the combustion process remains constant through the burner assembly 100.

Figure 8:
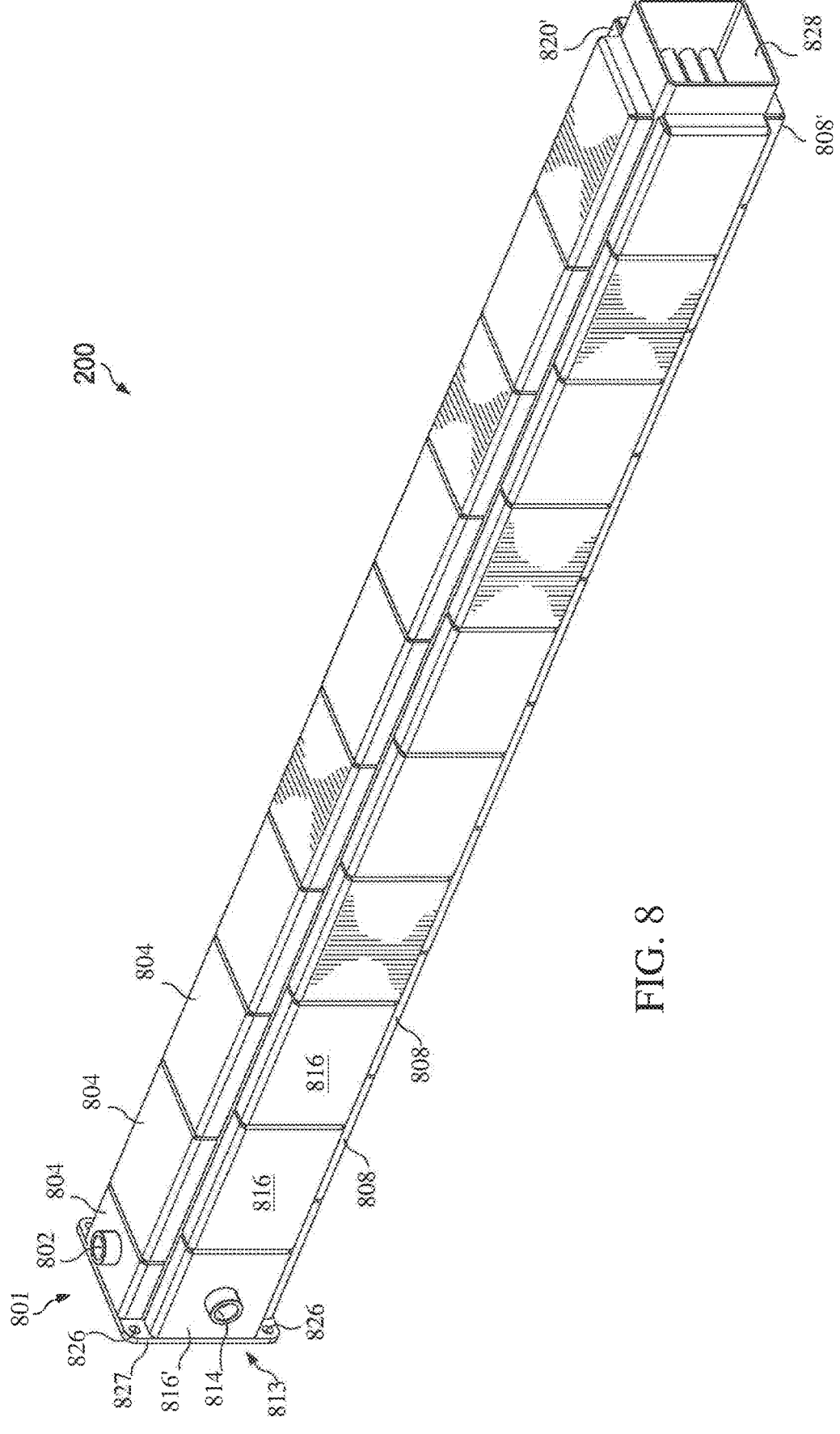
FIG. 8 is an oblique side view of a heat exchanger according to an embodiment of the disclosure.
Figure 9:
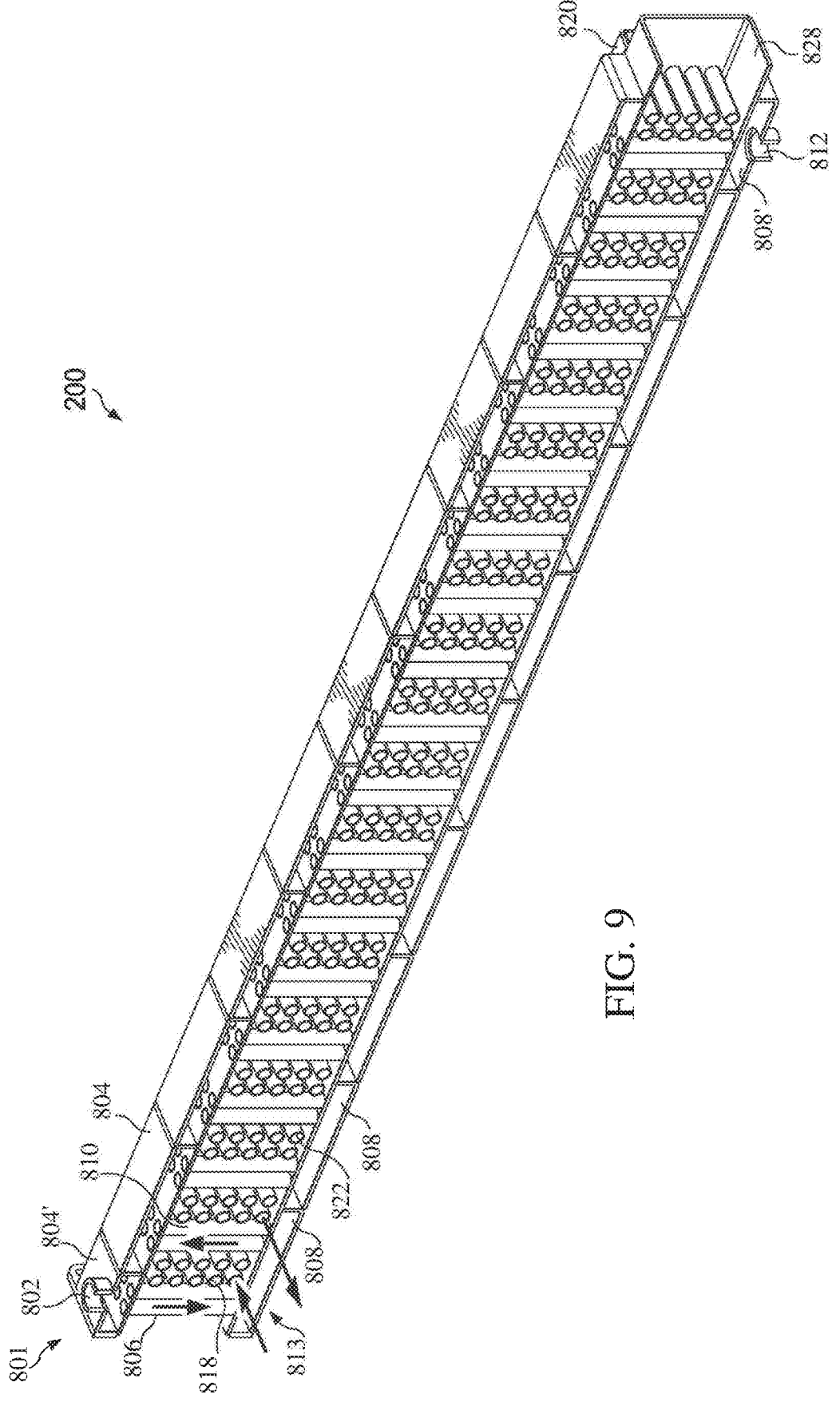
FIG. 9 is an oblique cross-sectional side view of the heat exchanger of FIG. 8 according to an embodiment of the disclosure.
Figure 10:
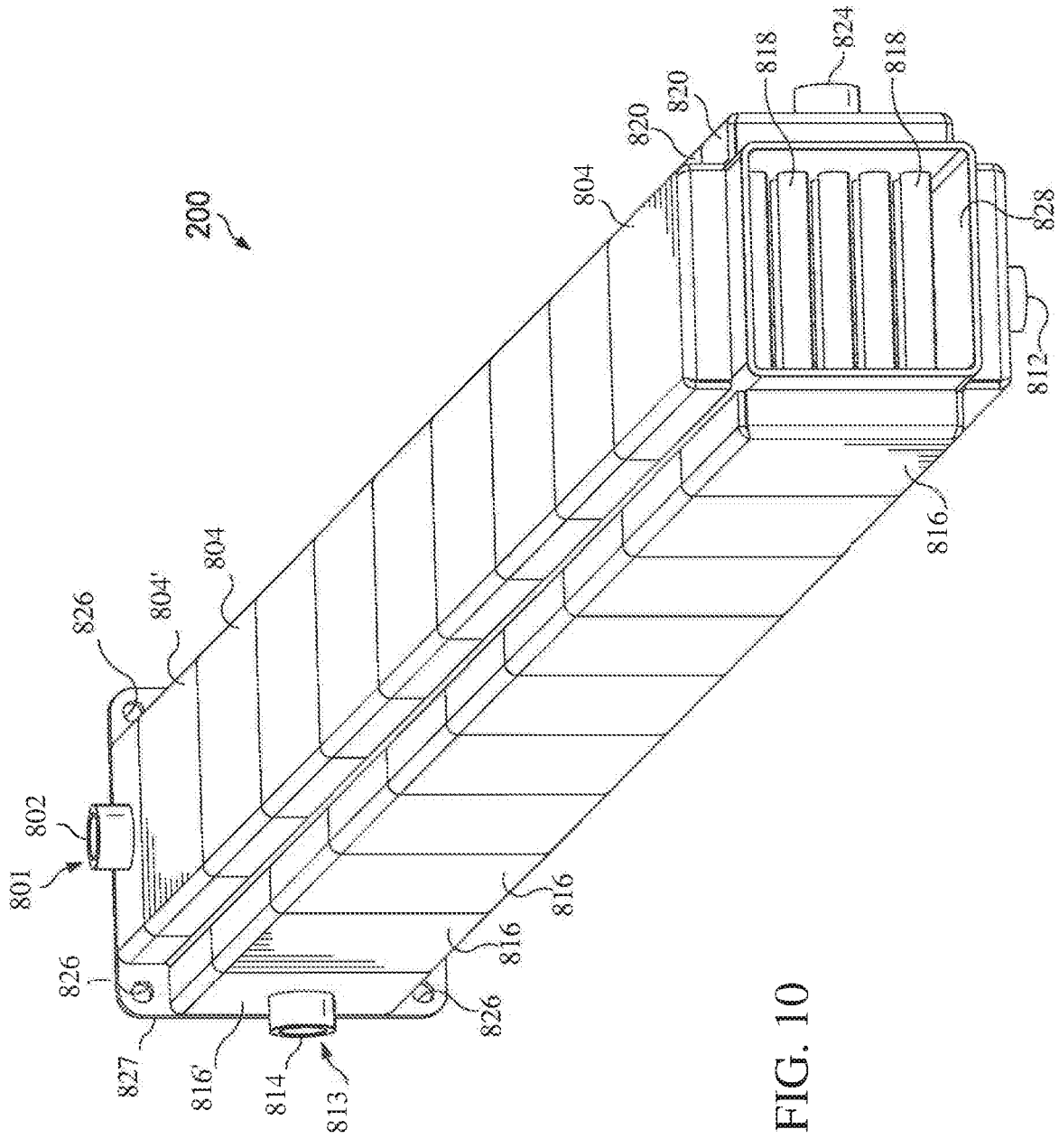
FIG. 10 is an oblique cross-sectional end view of the heat exchanger of FIGS. 8-9 according to an embodiment of the disclosure.

Referring now to FIGS. 8-10, further embodiments of the heat exchanger 200 are illustrated, more specifically an oblique side view, an oblique cross-sectional side view, and an oblique end view of the heat exchanger 200 are shown, respectively, according to an embodiment of the disclosure. The heat exchanger 200 comprises a first fluid circuit 801 having a first inlet 802, a plurality of top headers 804, a plurality of downward tubes 806, a plurality of bottom headers 808, a plurality of upward tubes 810, and a first outlet 812. The first inlet 802 is connected in fluid communication with a first top header 804' and is configured to receive a fluid therethrough and allow the fluid to enter the first top header 804'. The first top header 804' is connected in fluid communication with a first set of downward tubes 806, which is connected in fluid communication with a bottom header 808. Fluid from the first top header 804' may flow through the first set of downward tubes 806 into a bottom header 808. The bottom header 808 may also be connected in fluid communication with a set of upward tubes 810 that may carry fluid from the bottom header 808 through the upward tubes 810 and into another top header 804. Accordingly, this pattern may continue along the length of the heat exchanger 200, such that each top header 804 transfers fluid through a set of downward tubes 806 into a bottom header 808 and subsequently from the bottom header 808 through a set of upward tubes 810 into an adjacently downstream located top header 804.

Furthermore, it will be appreciated that downward tubes 806 may be associated with carrying a fluid from a top header 804 in a downward direction towards and into a bottom header 808, and upward tubes 810 may be associated with carrying a fluid from a bottom header 808 in an upward direction towards and into a top header 804. This pattern may continue along the length of the heat exchanger 200 until a last set of downward tubes 806 carries fluid through into a final bottom header 808' and out of the first outlet 812. Accordingly, the first fluid circuit 801 comprises passing fluid from the first inlet 802 into the first top header 804' through a repetitive serpentine series of downward tubes 806, a bottom header 808, a set of upward tubes 810, and a top header 804 until passing through a final set of downward tubes 806 into the final bottom header 808' and exiting the heat exchanger 200 through the first outlet 812. Furthermore, in other embodiments, it will be appreciated that the first inlet 802 and/or the first outlet 812 may alternatively be disposed both in a top header 804, both in a bottom header 808, or in opposing top and bottom headers 804, 808.

The heat exchanger 200 also comprises a second fluid circuit 813 having a second inlet 814, a plurality of left headers 816, a plurality of rightward tubes 818, a plurality of right headers 820, a plurality of leftward tubes 822, and a second outlet 824. The rightward tubes 818 and the leftward tubes 822 may be oriented substantially perpendicular to the downward tubes 806 and the upward tubes 810 of the first fluid circuit 801. The second inlet 814 is connected in fluid communication with a first left header 816' and is configured to receive a fluid therethrough and allow the fluid to enter the first left header 816'. The first left header 816' is connected in fluid communication with a first set of rightward tubes 818, which is connected in fluid communication with a right header 820. Fluid from the first left header 816' may flow through the first set of rightward tubes 818 into a right header 820. The right header 820 may also be connected in fluid communication with a set of leftward tubes 822 that may carry fluid from the right header 820 through the leftward tubes 822 and into another left header 816. Accordingly, this pattern may continue along the length of the heat exchanger 200, such that each left header 816 transfers fluid through a set of rightward tubes 818 into a right header 820 and subsequently from the right header 820 through a set of leftward tubes 822 into an adjacently downstream located left header 816.

Furthermore, it will be appreciated that rightward tubes 818 may be associated with carrying a fluid from a left header 816 in a rightward direction towards and into a right header 820, and leftward tubes 822 may be associated with carrying a fluid from a right header 820 in a leftward direction towards and into a left header 816. This pattern may continue along the length of the heat exchanger 200 until a last set of rightward tubes 818 carries fluid through into a final right header 820' and out of the second outlet 824. Accordingly, the second fluid circuit 813 comprises passing fluid from the second inlet 814 into the first left header 816' through a repetitive serpentine series of a set of rightward tubes 818, a right header 820, a set of leftward tubes 822, and a left header 816 until passing through a final set of rightward tubes 818 into the final right header 820' and exiting the heat exchanger 200 through the second outlet 824. Furthermore, in other embodiments, it will be appreciated that the second inlet 814 and/or the second outlet 824 may alternatively be disposed both in a left header 816, both in a right header 820, or in opposing left and right headers 816, 820. Additionally, it will be appreciated that in some embodiments, the heat exchanger 200 may comprise only one of the first fluid circuit 801 and the second fluid circuit 813.

Furthermore, it will be appreciated that the first fluid circuit 801 and the second fluid circuit 813 may comprise different lengths. Accordingly, the first inlet 802 and/or the first outlet 812 may be disposed in any of the top headers 804 or bottom headers 808, and the second inlet 814 and/or the second outlet 824 may be disposed in any of the left headers 816 and the right headers 820 to vary the length of the fluid circuits 801, 813, respectively. By altering the length of the fluid circuits 801, 813, the heat exchanger 200 may be configured to maintain a temperature gradient, reduce a pressure drop, and/or otherwise control the temperature and/or pressure of the fluid though each of the fluid circuits 801, 813.

The tubes 806, 810, 818, 822 of the heat exchanger 200 may generally be arranged to provide a compact, highly resistive flowpath through the fluid duct 828. In order to effectively and/or evenly distribute the heat produced by burner assembly 100 through the tubes 806, 810, 818, 822, sets and/or rows of tubes 806, 810 may be interstitially and/or alternatively spaced with sets and/or rows of tubes 818, 822. In the shown embodiment, two rows of downward tubes 806, two rows of rightward tubes 818, two rows of upward tubes 810, and two rows of leftward tubes 822 are interstitially and/or alternatively spaced, respectively, along the length of the heat exchanger 200. However, in alternative embodiments, a single row of tubes 806, 810, 818, 822 may be interstitially and/or alternatively spaced, respectively, along the length of the heat exchanger 200. In other embodiments, however, heat exchanger 200 may comprise any number of rows of tubes 806, 810, 818, 822 interstitially and/or alternatively spaced along the length of the heat exchanger 200. For example, heat exchanger 200 may comprise three rows of downward tubes 806, two rows of rightward tubes 818, three rows of upward tubes 810, and two rows of leftward tubes 822 interstitially and/or alternatively spaced. Accordingly, it will be appreciated that the number of rows of tubes 806, 810, 818, 822 interstitially and/or alternatively spaced may vary, so long as at least one row of vertically-oriented tubes 806, 810 is disposed adjacently with at least one row of horizontally-oriented tubes 818, 822 along the length of the heat exchanger 200.

The heat exchanger 200 also comprises a plurality of mounting holes 826 disposed through a mounting flange 827 that is disposed at the distal end of the heat exchanger 200 located closest to the first inlet 802 and the second inlet 814. The mounting holes 826 may generally be configured to mount the heat exchanger 200 to the burner assembly 100 of FIGS. 1-5. In some embodiments, the heat exchanger 200 may be secured to the burner assembly 100 via fasteners 124. However, in other embodiments, the heat exchanger 200 may be secured to the burner assembly 100 through an alternative mechanical interface. The heat exchanger 200 is secured to the burner assembly 100 so that combusted fuel and/or combusted air/fuel mixture is forced through a plurality of inner walls of the heat exchanger 200 that form a fluid duct 828 through the heat exchanger 200. Accordingly, heat from the combusted fuel and/or the combusted air/fuel mixture may be absorbed by a fluid flowing through the tubes 806, 810, 818, 822 of the heat exchanger 200. The heated fluid may exit the heat exchanger 200 through the first outlet 812 and the second outlet 824 of the first fluid circuit 801 and the second fluid circuit 813, respectively, and therefore be used to heat and/or cook consumable products (i.e., chips, crackers, frozen foods).

In operation, the configuration of tubes 806, 810, 818, 822 provides a compact, highly resistive flowpath through the fluid duct 828. Accordingly, to force combusted fuel and/or combusted air/fuel mixture through the fluid duct 828 requires high velocity. Accordingly, the velocity of the combusted fuel and/or the combusted air/fuel mixture through the first burners 126 of the burner assembly 100 is high enough to provide the requisite velocity needed to overcome the resistance to flow through the heat exchanger 200. Furthermore, the lower velocity of the combusted fuel and/or the combusted air/fuel mixture through the second burners 138 of the burner assembly 100 prevents "lift off" so that the combustion process remains constant through the burner assembly 100.

Figures 11, 12, 13:
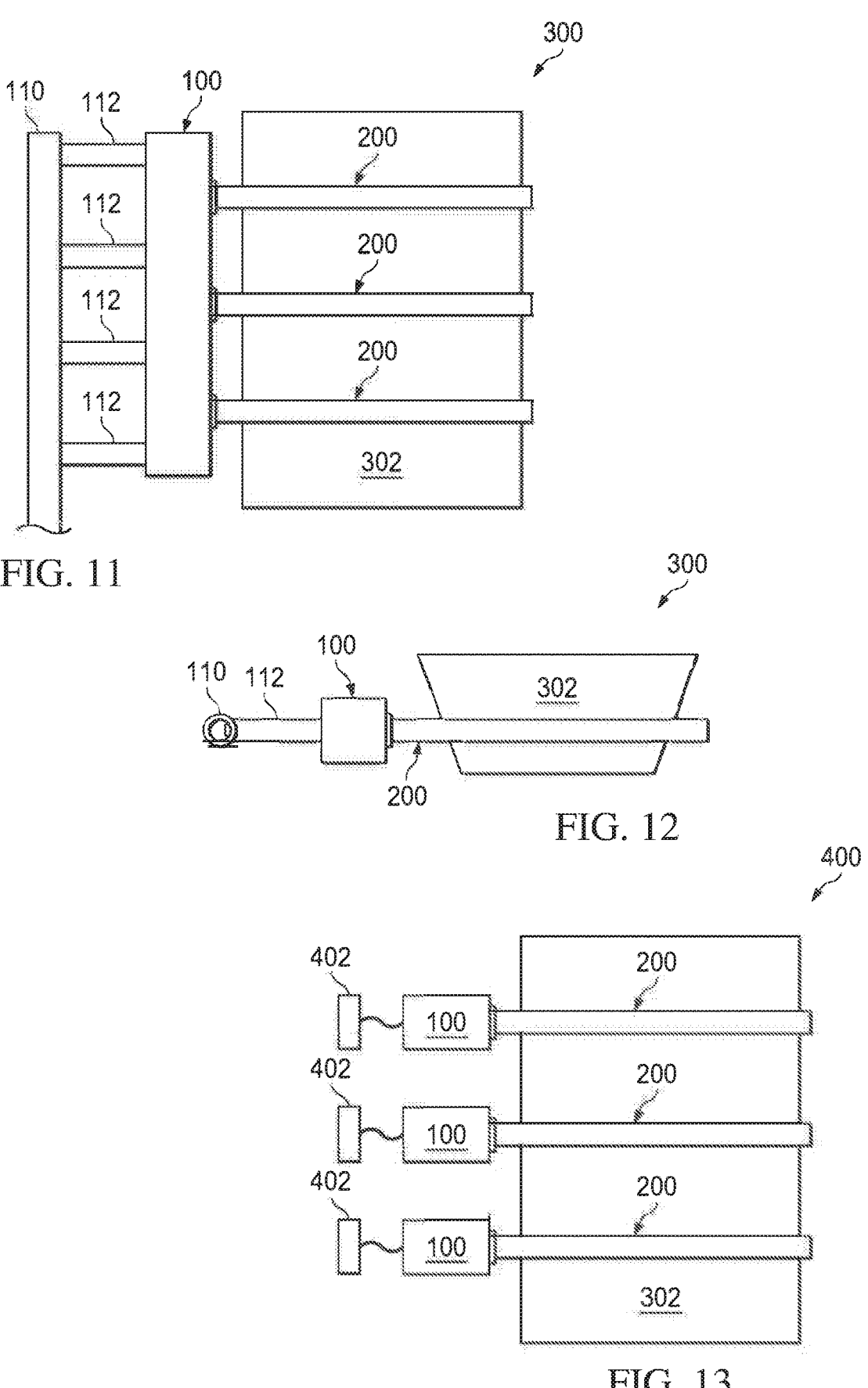
FIG. 11 is schematic top view of a cooking system according to an embodiment of the disclosure.
FIG. 12 is a schematic side view of the cooking system of FIG. 11 according to an embodiment of the disclosure.
FIG. 13 is a schematic top view of a cooking system according to another embodiment of the disclosure.

Referring now to FIGS. 11 and 12, a schematic top view and a schematic side view of a cooking system 300 are shown, respectively, according to an embodiment of the disclosure. Cooking system 300 generally comprises at least one burner assembly 100, at least one heat exchanger 200, and at least one cooking vessel 302 (e.g., a fryer). As previously disclosed, the burner assembly 100 may be mounted to at least one heat exchanger 200. However, in this embodiment, the burner assembly 100 may be mounted to a plurality of heat exchangers 200. Furthermore, while not shown, in some embodiments, multiple burner assemblies 100 may be mounted to multiple heat exchangers 200 in the cooking system 300. The burner assembly 100 is configured to provide a high velocity flow of combusted fuel and/or combusted air/fuel mixture through the fluid duct 222 of the heat exchanger 200. The heat exchangers 200 may generally be submerged in the cooking vessel 302.

Fluid, such as a cooking fluid (e.g., oil) contained within the cooking vessel 302, may be free to flow through the vertical tubes 214 and horizontal tubes 216 of the heat exchanger 200. Heat produced from the combustion of fuel and/or an air/fuel mixture in the burner assembly 100 may enter the inlet 202 of the heat exchanger 200 from the burner assembly 100 and be transferred to the fluid flowing through and/or contained within the tubes 214, 216 of the heat exchanger 200. Accordingly, in embodiments comprising multiple heat exchangers 200, the heat exchangers 200 may be disposed throughout the cooking vessel 302 at substantially similar intervals and/or uniformly spaced to maintain a substantially uniform temperature within the cooking vessel 302. However, in other embodiments comprising multiple heat exchangers 200, the heat exchangers 200 may be disposed to maintain a temperature gradient and/or temperature profile within the cooking vessel 302. The heated fluid may exit the heat exchanger 200 through the outlet 212. In some embodiments, the outlet 212 may extend through the cooking vessel 302 and be discharged to an outside environment through a collective exhaust header (not shown) and/or any other ductwork to expel the combusted gases. In some embodiments, fluid from the cooking vessel 302 may be circulated within the cooking vessel 302 by a pump (not shown) to increase and/or promote fluid flow through the tubes 214, 216 of the heat exchanger 200. Furthermore, it will be appreciated while burner assembly 100 is disclosed in the context of food service equipment (e.g., cooking vessel, fryer, boiler), the burner assembly 100 may be used for any application or industry that requires a fluid to be heated rapidly, consistently, and efficiently.

Referring now to FIG. 13, a schematic top view of a cooking system 400 is shown according to another embodiment of the disclosure. Cooking system 400 may be substantially similar to cooking system 300 of FIGS. 11 and 12. However, in this embodiment, cooking system 400 comprises a plurality of burners, wherein each burner assembly 100 may be mounted to a single heat exchanger 200. The burner assembly 100 is configured to provide a high velocity flow of combusted fuel and/or combusted air/fuel mixture through the fluid duct 222 of the heat exchanger 200. The heat exchangers 200 may generally be submerged in the cooking vessel 302. Fluid, such as a cooking fluid (e.g., oil) contained within the cooking vessel 302, may be free to flow through the vertical tubes 214 and horizontal tubes 216 of the heat exchanger 200. Heat produced from the combustion of fuel and/or an air/fuel mixture in the burner assembly 100 may enter the inlet 202 of each heat exchanger 200 from the burner assembly 100 and be transferred to the fluid flowing through and/or contained within the tubes 214, 216 of the heat exchanger 200. Additionally, heat may be transferred to the fluid within the cooking vessel 302 that contacts any outer surface of the heat exchangers 200.

In this embodiment, the heat exchangers 200 may generally be disposed throughout the cooking vessel 302 at substantially similar intervals and/or uniformly spaced to maintain a substantially uniform temperature within the cooking vessel 302. However, in other embodiments, the heat exchangers 200 may be disposed at any other interval and/or spacing based on a desired temperature profile across the cooking vessel 302 and/or the configuration of the cooking vessel 302. Thus, in some embodiments, the burner assemblies 100 and heat exchangers 200 are disposed to maintain a temperature gradient and/or temperature profile within the cooking vessel 302. In addition, to accomplish control of the burner assemblies 100, each burner assembly 100 may be controlled by a burner assembly controller 402. As such, the burner assembly controller 402 may control each burner assembly 100 to a specified amount of heat in order to maintain a temperature gradient and/or temperature profile of the fluid within the cooking vessel 302. However, in other embodiments, the burner assemblies 100 may be controlled to provide a substantially similar amount of heat to maintain a substantially similar temperature of the fluid throughout the cooking vessel 302. In such embodiments, multiple burner assemblies 100 may, at least in some instances, be controlled by a single burner assembly controller 402. The heated fluid may exit the heat exchanger 200 through an outlet 212 in each heat exchanger 200. In some embodiments, the outlet 212 may extend through the cooking vessel 302 and be discharged to an outside environment through a collective exhaust header (not shown) and/or any other ductwork to expel the combusted gases. In some embodiments, fluid from the cooking vessel 302 may be circulated within the cooking vessel 302 by a pump (not shown) to increase and/or promote fluid flow through the tubes 214, 216 of the heat exchanger 200. Furthermore, it will be appreciated while burner assembly 100 is disclosed in the context of food service equipment (i.e., cooking vessel, fryer, boiler), the burner assembly 100 may be used for any application or industry that requires a fluid to be heated rapidly, consistently, and efficiently.

Figure 14:
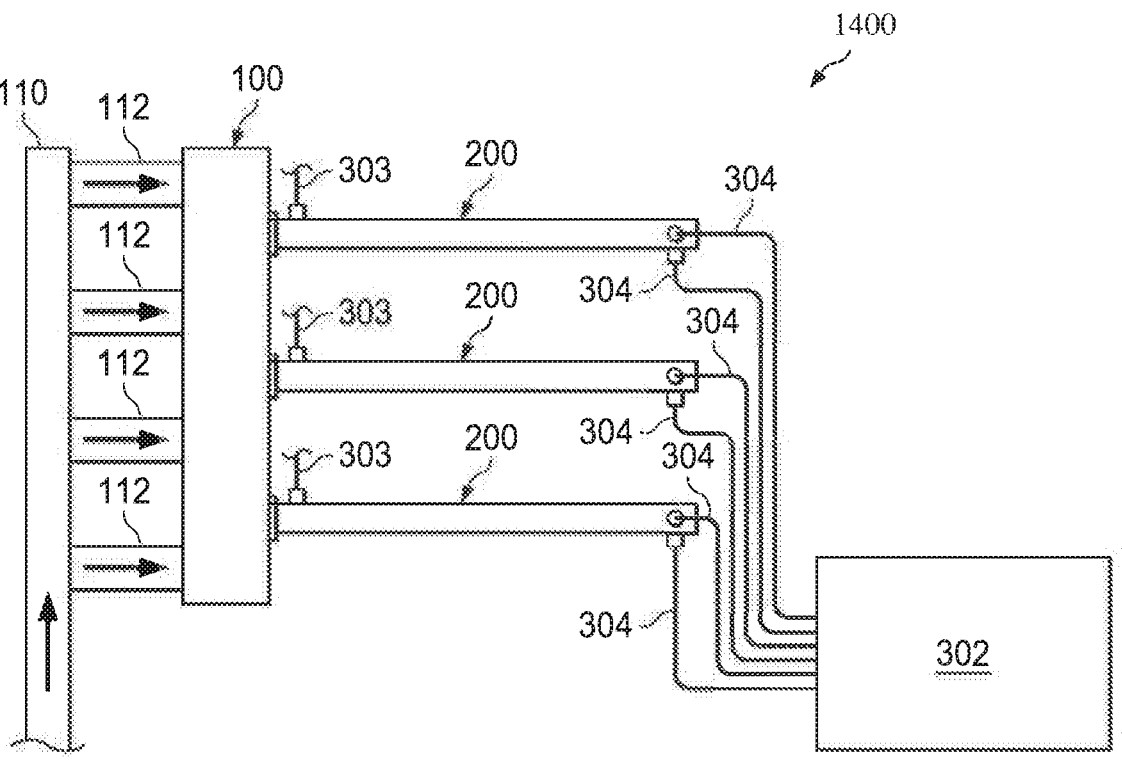
FIG. 14 is a schematic of a cooking system according to an embodiment of the disclosure.
Figure 15:
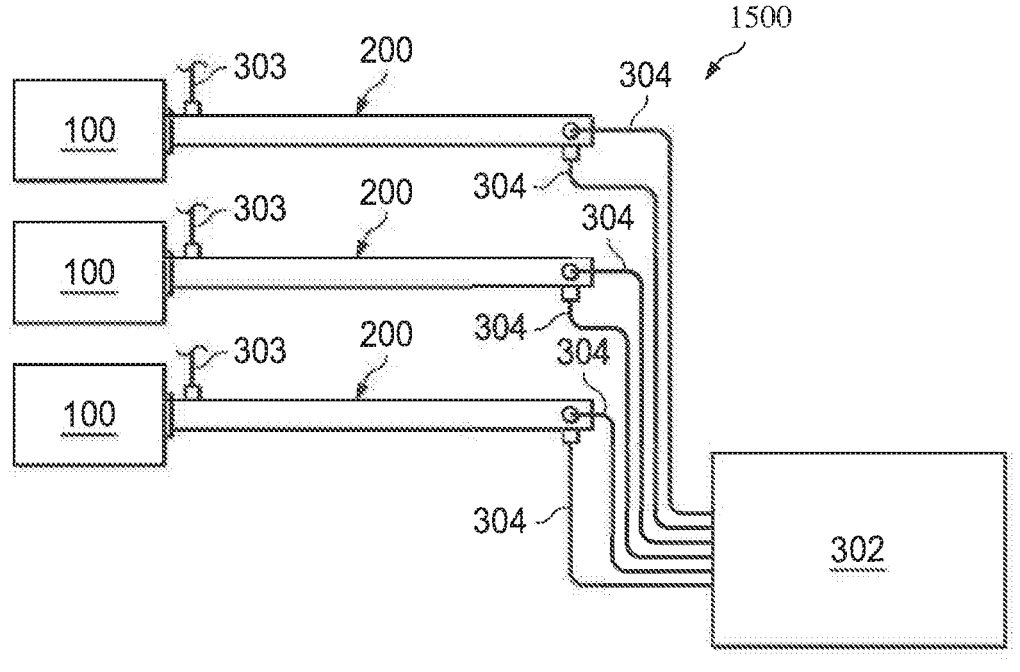
FIG. 15 is a schematic of a cooking system according to another embodiment of the disclosure.

Referring now to FIG. 14, a schematic of another embodiment of a cooking system 1400 is shown according to an embodiment of the disclosure. The cooking system 1400 and 1500 of the embodiments disclosed in FIGS. 14 and 15 are described with respect to the heat exchangers 200 described in FIGS. 8-10, but it should be understood that the cooking system 1400 may also be used with the heat exchangers 200 described in FIGS. 6-7, as well as with others, or in various combinations. Cooking system 1400 generally comprises at least one burner assembly 100, at least one heat exchanger 200, at least one cooking vessel 302 (e.g., a fryer), at least one oil input line 303, and at least one oil output line 304. As previously disclosed, the burner assembly 100 may be mounted to at least one heat exchanger 200. However, in this embodiment, the burner assembly 100 may be mounted to a plurality of heat exchangers 200. Furthermore, while not shown, in some embodiments, multiple burner assemblies 100 may be mounted to multiple heat exchangers 200 in the cooking system 1400. The burner assembly 100 is configured to provide a high velocity flow of combusted fuel and/or combusted air/fuel mixture through the fluid duct 828 (referring also to FIGS. 8-10) of the heat exchangers 200.

Fluid, such as a cooking fluid (e.g., oil) may be pumped into the first inlet 802 and/or the second inlet 814 of the heat exchangers 200 through a plurality of oil input lines 303, each oil input line 303 being associated with a respective inlet 802, 814. Fluid may enter the oil input lines 303 from a reservoir and/or may be circulated through the heat exchangers 200 from the cooking vessel 302. The fluid may be pumped and/or passed through the tubes 806, 810, 818, 822 of the heat exchangers 200. Heat produced from the combustion of fuel and/or an air/fuel mixture in the burner assembly 100 may be transferred to the fluid flowing through the tubes 806, 810, 818, 822 of the heat exchangers 200. The heated fluid may exit the heat exchanger 200 through the first outlet 812 and the second outlet 824 and be carried into the cooking vessel 302 through a plurality of oil output lines 304, each oil output line 304 being associated with a respective outlet 812, 824. In some embodiments, the heated fluid may be carried into the cooking vessel 302 at different locations to maintain a proper temperature, temperature gradient, and/or temperature profile within the cooking vessel 302. As stated, in some embodiments, fluid from the cooking vessel 302 may be recirculated through the oil input lines 303 and reheated within the heat exchangers 200. Furthermore, it will be appreciated while burner assembly 100 is disclosed in the context of food service equipment (e.g., fryer, boiler), the burner assembly 100 may be used for any application or industry that requires a fluid to be heated rapidly, consistently, and efficiently.

Referring now to FIG. 15, a schematic of a cooking system 1500 is shown according to another embodiment of the disclosure. Cooking system 1500 may be substantially similar to cooking system 1400 of FIG. 14. However, cooking system 1500 comprises a plurality of burner assemblies 100, a plurality of heat exchangers 200, at least one cooking vessel 302 (i.e., a fryer), at least one oil input line 303 per heat exchanger 200, and at least one oil output line 304 per heat exchanger 200. As previously disclosed, each burner assembly 100 may be associated with at least one heat exchanger 200. However, in this embodiment, each burner assembly 100 may be mounted to a single heat exchanger 200. Each burner assembly 100 is configured to provide a high velocity flow of combusted fuel and/or combusted air/fuel mixture through the fluid duct 228 of the associated heat exchanger 200.

Fluid, such as a cooking fluid (e.g., oil) may be pumped into the first inlet 802 and/or the second inlet 814 of the heat exchanger 200 through a plurality of oil input lines 303, each oil input line 303 being associated with a respective inlet 802, 814. Fluid may enter the oil input lines 303 from a reservoir and/or may be circulated through the heat exchangers 200 from the cooking vessel 302. The fluid may be pumped and/or passed through the tubes 806, 810, 818, 822 of the heat exchanger 200. Heat produced from the combustion of fuel and/or an air/fuel mixture in the burner assemblies 100 may be transferred to the fluid flowing through the tubes 806, 810, 818, 822 of each respective heat exchanger 200. The heated fluid may exit the heat exchangers 200 through the first outlet 812 and the second outlet 824 of each heat exchanger 200 and be carried into the cooking vessel 302 through a plurality of oil output lines 304, each oil output line 304 being associated with a respective outlet 212, 224.

In some embodiments, the heated fluid may be carried into the cooking vessel 302 at different locations to maintain a proper temperature, temperature gradient, and/or temperature profile within the cooking vessel 302. Furthermore, it will be appreciated that each burner assembly 100 may be individually controlled by a burner controller (not pictured). As such, in some embodiments, each burner assembly 100 may be operated at substantially similar temperatures. However, in other embodiments, each burner assembly 100 may be operated at different temperatures to maintain a temperature gradient across the cooking vessel 302 and/or to control a cooking process requiring different temperatures. Still further, while multiple burner assemblies 100 and multiple heat exchangers 200 are pictured, in some embodiments, a single burner assembly 100 may be associated with a single heat exchanger 200 to provide heated fluid to the cooking vessel 302. As stated, in some embodiments, fluid from the cooking vessel 302 may be recirculated through the oil input lines 303 and reheated within the heat exchangers 200. Furthermore, it will be appreciated while burner assembly 100 is disclosed in the context of food service equipment (e.g., fryer, boiler), the burner assembly 100 may be used for any application or industry that requires a fluid to be heated rapidly, consistently, and efficiently.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A cooking system, comprising:
a burner assembly;
a cooking vessel; and
a heat exchanger comprising:
    a top wall, a bottom wall, a right side wall, and a left side wall, the top, bottom, right side, and left side walls defining a duct, the duct configured to receive combusted fuel and/or combusted air/fuel mixture from the burner assembly,
a first fluid circuit fluidly coupled to the cooking vessel, the first fluid circuit including:
    top headers positioned on a top side of the duct,
    bottom headers positioned on a bottom side of the duct,
    upward tubes fluidly coupled to and extending through the top and bottom walls to the bottom headers and the top headers, wherein the upward tubes are downstream from the bottom headers, wherein the upward tubes are positioned within the duct, and
    downward tubes fluidly coupled to and extending through the top and bottom walls to the top headers and the bottom headers, wherein the downward tubes are downstream from the top headers, wherein the downward tubes are positioned within the duct, and
a second fluid circuit fluidly coupled to the cooking vessel, the second fluid circuit including:
    left headers positioned on a left side of the duct,
    right headers positioned on a right side of the duct,
    rightward tubes fluidly coupled to and extending through the right side and left side walls to the left headers and the right headers, wherein the rightward tubes are downstream from the left headers, and
    leftward tubes fluidly coupled to and extending through the right side and left side walls to the right headers and the left headers, wherein the leftward tubes are downstream from the right headers, and
wherein a first top header of the top headers includes a first end and a second end, wherein the first top header is attached at the first end to the top wall directly above a first position of a first plurality of leftward or rightward tubes in the duct, wherein the first top header is further attached at the second end to the top wall directly above a second position of a second plurality of leftward or rightward tubes in the duct, wherein a first and a second plurality of upward or downward tubes are positioned in the duct between the first plurality and second plurality of leftward or rightward tubes, and wherein a third plurality of leftward or rightward tubes is located between the first and the second plurality of upward or downward tubes.

2. The cooking system of claim 1, wherein the first fluid circuit further comprises a first inlet fluidly coupled to a top header, wherein the first inlet is fluidly coupled to the cooking vessel, wherein the cooking vessel contains a cooking fluid.

3. The cooking system of claim 1, wherein the first fluid circuit further comprises a first inlet fluidly coupled to a bottom header, wherein the first inlet is fluidly coupled to the cooking vessel, wherein the cooking vessel contains a cooking fluid.

4. The cooking system of claim 1, wherein the first fluid circuit further comprises a first outlet fluidly coupled to a top header, wherein the first outlet is fluidly coupled to the cooking vessel, wherein the cooking vessel contains a cooking fluid.

5. The cooking system of claim 1, wherein the first fluid circuit further comprises a first outlet fluidly coupled to a bottom header, wherein the first outlet is fluidly coupled to the cooking vessel, wherein the cooking vessel contains a cooking fluid.

6. The cooking system of claim 1, wherein the second fluid circuit further comprises a second inlet fluidly coupled to a left header, wherein the second inlet is fluidly coupled to the cooking vessel, wherein the cooking vessel contains a cooking fluid.

7. The cooking system of claim 1, wherein the second fluid circuit further comprises a second inlet fluidly coupled to a right header, wherein the second inlet is fluidly coupled to the cooking vessel, wherein the cooking vessel contains a cooking fluid.

8. The cooking system of claim 1, wherein the second fluid circuit further comprises a second outlet fluidly coupled to a left header, wherein the second outlet is fluidly coupled to the cooking vessel, wherein the cooking vessel contains a cooking fluid.

9. The cooking system of claim 1, wherein the second fluid circuit further comprises a second outlet fluidly coupled to a right header, wherein the second outlet is fluidly coupled to the cooking vessel, wherein the cooking vessel contains a cooking fluid.

10. A heat exchanger, comprising:
a top wall, a bottom wall, a right side wall, and a left side wall, the top, bottom, right side, and left side walls defining a duct, the duct configured to receive combusted fuel and/or combusted air/fuel mixture;
a first fluid circuit fluidly coupled to a vessel, the first fluid circuit including:
top headers positioned on a top side of the duct,
bottom headers positioned on a bottom side of the duct,
first tubes fluidly coupled to and extending through the top and bottom walls to the bottom headers and the top headers; and
a second fluid circuit fluidly coupled to the vessel, the second fluid circuit including:
left headers positioned on a left side of the duct,
right headers positioned on a right side of the duct, and
second tubes fluidly coupled to and extending through the right side and left side walls to the left headers and the right headers,
wherein the first and second tubes are positioned within the duct,
wherein at least some of the second tubes are located between a first plurality of the first tubes and a second plurality of the first tubes,
wherein the second plurality of first tubes is located between a first plurality of the second tubes and a second plurality of the second tubes, and
wherein a first top header of the top headers includes a first end and a second end, wherein the first top header is attached at the first end to the top wall directly above a first position of the first plurality of second tubes in the duct, wherein the first top header is further attached at the second end to the top wall directly above a second position of the second plurality of second tubes in the duct, wherein the first and the second plurality of first tubes are positioned in the duct between the first plurality and the second plurality of second tubes, and wherein a third plurality of second tubes is located between the first and the second plurality of first tubes.

11. The heat exchanger of claim 10, wherein the top headers are positioned longitudinally along the top side of the duct and the bottom headers are positioned longitudinally along the bottom side of the duct such that the position of the top headers along the top side of the duct is staggered relative to the position of the bottom headers along the bottom side of the duct, and wherein the staggered relationship of the top and bottom headers is such that at least one of the top headers overlaps positionally on the top side of the duct relative to the position of at least one of the bottom headers on the bottom side of the duct.

12. The heat exchanger of claim 10, further comprising one or more burners in fluid communication with the duct.

13. The heat exchanger of claim 12, wherein at least one top header defines a housing enclosing a fluid passageway extending between the first end and second end of the at least one top header to promote fluid communication between the first plurality of first tubes and the second plurality of first tubes.

14. The heat exchanger of claim 10, wherein a first bottom header is oppositely disposed on the bottom side relative to a top header disposed on the top side.

15. A heat exchanger comprising:
a top wall, a bottom wall, a right side wall, and a left side wall, the top, bottom, right side, and left side walls defining a duct,
a first fluid circuit fluidly coupled to a vessel, the first fluid circuit including:
top headers positioned on a top side of the duct,
bottom headers positioned on a bottom side of the duct,
upward tubes fluidly coupled to and extending through the top and bottom walls to the bottom headers and the top headers, wherein the upward tubes are downstream from the bottom headers, and wherein the upward tubes are positioned within the duct, and
downward tubes fluidly coupled to and extending through the top and bottom walls to the top headers and the bottom headers, wherein the downward tubes are downstream from the top headers, and wherein the downward tubes are positioned within the duct; and
a second fluid circuit fluidly coupled to the vessel, the second fluid circuit including:
left headers positioned on a left side of the duct,
right headers positioned on a right side of the duct,
rightward tubes fluidly coupled to and extending through the right side and left side walls to the left headers and the right headers, wherein the rightward tubes are downstream from the left headers, and
leftward tubes fluidly coupled to and extending through the right side and left side walls to the right headers and the left headers, wherein the leftward tubes are downstream from the right headers, and
wherein a first top header of the top headers includes a first end and a second end, wherein the first top header is attached at the first end to the top wall directly above a first position of a first plurality of leftward or rightward tubes in the duct, wherein the first top header is further attached at the second end to the top wall directly above a second position of a second plurality of leftward or rightward tubes in the duct, wherein a first and a second plurality of upward or downward tubes are positioned in the duct between the first plurality and second plurality of leftward or rightward tubes, and wherein a third plurality of leftward or rightward tubes is located between the first and the second plurality of upward or downward tubes.

16. The heat exchanger of claim 15, wherein the first fluid circuit and the second fluid circuit are fluidly coupled to the vessel via one or more headers.

17. The heat exchanger of claim 16, wherein the first and second fluid circuits comprise a first fluid inlet and a first fluid outlet, the first fluid inlet and outlet in fluid communication with the one or more headers.

18. The heat exchanger of claim 15, wherein the top headers are positioned longitudinally along the top side of the duct and the bottom headers are positioned longitudinally along the bottom side of the duct such that the position of the top headers along the top side of the duct is staggered relative to the position of the bottom headers along the bottom side of the duct, and wherein the staggered relationship of the top and bottom headers is such that at least one of the top headers overlaps positionally on the top side of the duct relative to the position of at least one of the bottom headers on the bottom side of the duct.

19. The heat exchanger of claim 15, wherein the top headers are positioned longitudinally along the top side of the duct and the bottom headers are positioned longitudinally along the bottom side of the duct such that the position of the top headers along the top side of the duct is staggered relative to the position of the bottom headers along the bottom side of the duct, and wherein the left headers are positioned longitudinally along the left side of the duct and the right headers are positioned longitudinally along the right side of the duct such that the position of the left headers along the left side of the duct is staggered relative to the position of the right headers along the right side of the duct.

* * * * *